(12) United States Patent
Krumm et al.

(10) Patent No.: US 6,807,286 B1
(45) Date of Patent: Oct. 19, 2004

(54) OBJECT RECOGNITION USING BINARY IMAGE QUANTIZATION AND HOUGH KERNELS

(75) Inventors: John Krumm, Redmond, WA (US); Richard J. Campbell, Columbus, OH (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/548,182

(22) Filed: Apr. 13, 2000

(51) Int. Cl.[7] .................. G06K 9/00; G06K 9/36; G06K 9/62; G06K 9/48; G06K 9/56

(52) U.S. Cl. ............... 382/103; 382/199; 382/205; 382/281; 382/291

(58) Field of Search ................ 382/197, 199, 382/200, 205, 281, 291, 103, 141, 142, 143, 144, 145, 146, 147, 148, 149, 150, 151, 152, 153, 154, 159

(56) References Cited

U.S. PATENT DOCUMENTS 4,479,145 A * 10/1984 Azuma et al. ............... 382/199
4,618,989 A * 10/1986 Tsukune et al. ............. 382/203

(List continued on next page.)

FOREIGN PATENT DOCUMENTS

JP  2000030062 A * 1/2000 ............. G06T/7/00

OTHER PUBLICATIONS

Xiong et al., "Registration, Calibration and Blending in Creating High Quality Panoramas," Applications of Computer Vision, 1998. WACV '98. Proceedings, Fourth IEEE Workshop on, Oct. 19–21, 1998, pp. 69–74.*

(List continued on next page.)

*Primary Examiner*—Jingge Wu
*Assistant Examiner*—Ryan J. Hesseltine
(74) *Attorney, Agent, or Firm*—Lyon & Harr, LLP; Richard T. Lyon

(57) ABSTRACT

A system and process for recognizing an object in an input image involving first generating training images depicting the object. A set of prototype edge features is created that collectively represent the edge pixel patterns encountered within a sub-window centered on each pixel depicting an edge of the object in the training images. Next, a Hough kernel is defined for each prototype edge feature in the form of a set of offset vectors representing the distance and direction, from each edge pixel having an associated sub-window exhibiting an edge pixel pattern best represented by the prototype edge feature, to a prescribed reference point on a surface of the object. The offset vectors are represented as originating at a central point of the kernel. For each edge pixel in the input image, the prototype edge feature which best represents the edge pixel pattern exhibited within the sub-window centered on the edge pixel is identified. Then, for each input image pixel location, the number of offset vectors terminating at that location from Hough kernels centered on each edge pixel location of the input image is identified. The Hough kernel centered on each pixel location is the Hough kernel associated with the prototype edge feature best representing the edge pixel pattern exhibited within a sub-window centered on that input image edge pixel location. The object is declared to be present in the input image if any of the input image pixel locations have a quantity of offset vectors terminating thereat that equals or exceeds a detection threshold.

42 Claims, 23 Drawing Sheets

(1 of 23 Drawing Sheet(s) Filed in Color)

U.S. PATENT DOCUMENTS

| | | | | | |
|---|---|---|---|---|---|
| 4,642,813 | A | * | 2/1987 | Wilder | 382/147 |
| 4,685,143 | A | * | 8/1987 | Choate | 382/170 |
| 4,707,647 | A | * | 11/1987 | Coldren et al. | 382/151 |
| 4,876,728 | A | * | 10/1989 | Roth | 382/153 |
| 5,054,098 | A | * | 10/1991 | Lee | 382/289 |
| 5,063,604 | A | * | 11/1991 | Weiman | 382/170 |
| 5,220,621 | A | * | 6/1993 | Saitoh | 382/200 |
| 5,235,650 | A | * | 8/1993 | Jeong | 382/158 |
| 5,313,532 | A | * | 5/1994 | Harvey et al. | 382/156 |
| 5,365,600 | A | * | 11/1994 | Nagaishi | 382/281 |
| 5,430,810 | A | * | 7/1995 | Saeki | 382/281 |
| 5,600,733 | A | * | 2/1997 | MacDonald et al. | 382/144 |
| 5,638,465 | A | * | 6/1997 | Sano et al. | 382/281 |
| 5,796,426 | A | * | 8/1998 | Gullichsen et al. | 348/207.99 |
| 5,930,378 | A | * | 7/1999 | Kubota et al. | 382/107 |
| 6,016,439 | A | * | 1/2000 | Acker | 600/411 |
| 6,094,501 | A | * | 7/2000 | Beatty | 382/154 |
| 6,111,993 | A | * | 8/2000 | Matsunaga | 382/281 |
| 6,201,988 | B1 | * | 3/2001 | Bourland et al. | 600/427 |
| 6,271,847 | B1 | * | 8/2001 | Shum et al. | 345/418 |
| 6,359,617 | B1 | * | 3/2002 | Xiong | 345/848 |
| 6,493,465 | B2 | * | 12/2002 | Mori et al. | 382/209 |
| 6,697,535 | B1 | * | 2/2004 | Dutta-Choudhury | 382/266 |

OTHER PUBLICATIONS

Leymarie et al., "Simulating the Grassfire Transform Using an Active Contour Model," Pattern Analysis and Machine Intelligence, IEEE Transactions on, vol.: 14 Issue: Jan. 1, 1992.*

Hu, Gongzhu, "3–D Object Matching in the Hough Space," Systems, Man and Cybernetics, 1995. 'Intelligent Systems for the 21st Century', IEEE International Conference on, vol.: 3, Oct. 22–25, 1995, pp. 2718–2723 vol. 3.*

Krumm, John, "Vector Quantized Binary Features for Visual Pose Measurment," Robotics and Automation, 1997. Proceedings, 1997 IEEE International Conference on, vol.: 2, Apr. 20–25, 1997, pp. 1645–1654 vol. 2.*

Nasrabadi et al., "A stereo vision technique using curve–segments and relaxation matching." 9th International Conference on Pattern Recognition, Nov. 14–17, 1988, pp 149–151, vol. 1.*

Bulot et al., "Contour segmentation using Hough transform." International Conference on Image Processing Proceedings, Sep. 16–10, 1996, pp 583–586, vol. 3.*

Krumm et al. "Texture segmentation and shape in the same image." Proceedings from the Fifth International Conference on Computer Vision, Jun. 20–23, 1995, pp 121–127.*

Krumm, John. "Eigenfeatures for planar pose measurement of partially occluded objects." Proceedings from the IEEE Computer Society Conference on Computer Vision and Pattern Recognition, Jun. 18–20, 1996, pp 55–60.*

Krumm, John. "Object detection with vector quantized binary features." Proceedings from the IEEE Computer Society Conference on Computer Vision and Pattern Recognition, Jun. 17–19, 1997, pp 179–185.*

Campbell et al. "Object recognition for an intelligent room." Proceedings from the IEEE Computer Society Conference on Computer Vision and Pattern Recognition, Jun. 13–15, 2000, vol. 1, pp 691–697.*

D. H. Ballard, "Generalizing the Hough Transform to Detect Arbitrary Shapes," Pattern Recognition, vol. 13, No. 2, pp. 111–122, 1981.

K. Bowyer, C. Kranenburg, S Dougherty, "Edge Detector Evaluation Using Empirical ROC Curves," CVPR99, 1999, pp. 354–359.

C. M. Brown, "Inherent Bias and Noise in the Hough Transform", IEEE Transactions on Pattern Analysis and Machine Intelligence, vol. 5, No. 5, pp. 493–505, 1983.

R. M. Gray, "Vector Quantization", IEEE ASSP Magazine, pp. 4–29, Apr. 1984.

D. P. Huttenlocher, G. A. Klanderman, and W. J. Rucklidge, "Comparing Image Using the Hausdorff Distance," IEEE Transactions on Pattern Analysis and Machine Intelligence, vol. 15, No. 9, pp. 850–863, 1993.

K. Ohba and K. Ikeuchi, "Recognition of the Multi Specularity Objects Using the Eigen–Window", ICPR96, 1996, pp. A81.23.

* cited by examiner

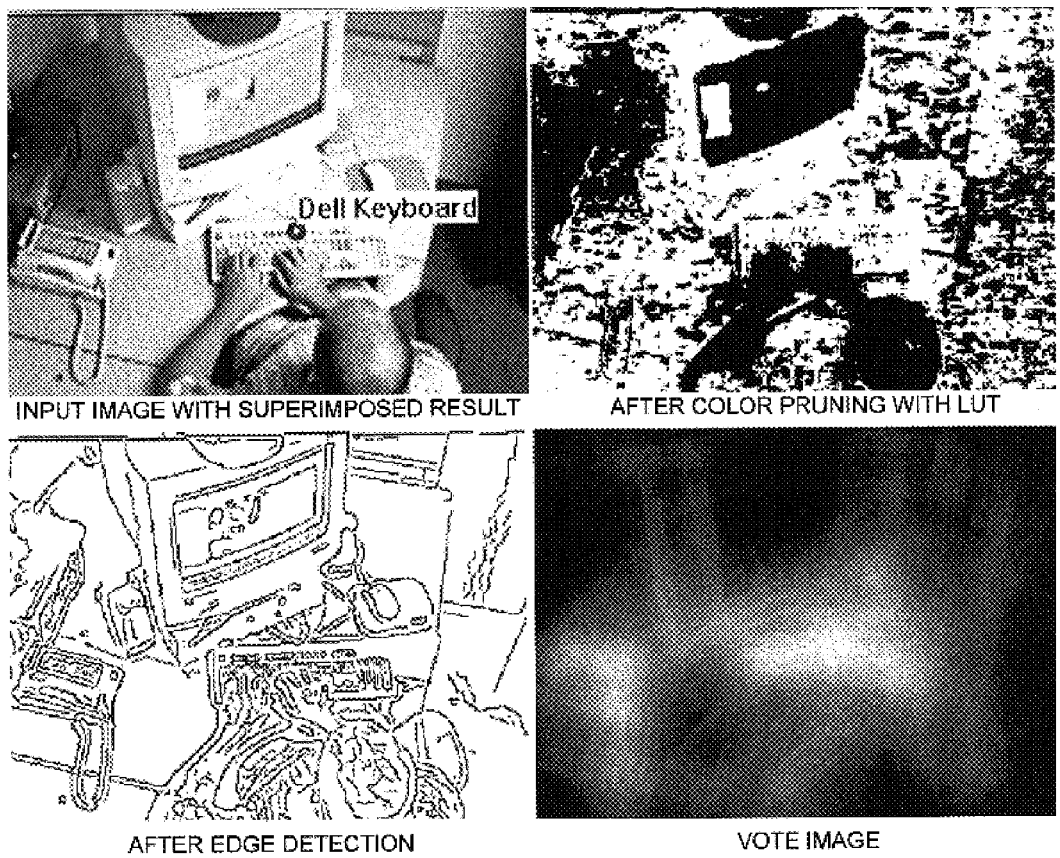
FIGS. 18A-D

OBJECT RECOGNITION USING BINARY IMAGE QUANTIZATION AND HOUGH KERNELS

BACKGROUND

1. Technical Field

The invention is related to object recognition systems, and more particularly to a system and process for recognizing objects in an image using binary image quantization and Hough kernels.

2. Background Art

Recent efforts in the field of object recognition in images have been focused on developing processes especially suited for finding everyday objects in a so-called intelligent environment monitored by color video cameras. An intelligent environment in simple terms is a space, such as a room in a home or office, in which objects and people are monitored, and actions are taken automatically based on what is occurring in the space. Some examples of the actions that may be taken, which would require the ability to recognize objects, include:

Customizing a device's behavior based on location. A keyboard near a computer monitor could direct its input to the application(s) on that monitor. A keyboard in the hands of a particular user could direct its input to that user's application(s), and it could invoke that user's preferences (e.g., repeat rate on keys).

Finding lost objects in a room like a television remote control.

Inferring actions and intents by identifying objects that are being used by person. A user picking up a book probably wants to read, and the lights and music could be adjusted appropriately.

Unfortunately, existing object recognition algorithms that could be employed for use in an intelligent environment are not written with a normal consumer in mind. This has lead to programs that would be impractical to use for a mass market audience. These impracticalities include speed of execution, elaborate training rituals, and the setting of numerous adjustable parameters.

It is believed that for an object recognition program to be generally acceptable to a typical person who would like to benefit from an intelligent environment, it would have to exhibit the following attributes. Besides the usual requirements for being robust to background clutter and partial occlusion, a desirable object recognition program should also run at moderate speeds on relatively inexpensive hardware. The program should also be simple to train and the number of parameters that a user would be expected to set should be kept to a minimum.

The present invention provides an object recognition system and process that exhibits the foregoing desired attributes.

It is noted that in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [1, 2]. A listing of the publications corresponding to each designator can be found at the end of the Detailed Description section.

SUMMARY

The present invention is embodied in a new object recognition system and process that is capable of finding objects in an environment monitored by color video cameras. This new system and process can be trained with only a few images of the object captured using a standard color video camera. In tested embodiments, the present object recognition program was found to run at 0.7 Hz on a typical 500 MHz PC. It also requires a user to set only two parameters. Thus, the desired attributes of speed, simplicity, and use of inexpensive equipment are realized.

Generally, the present object recognition process represents an object's features as small, binary quantized edge templates, and it represents the object's geometry with "Hough kernels". The Hough kernels implement a variant of the generalized Hough transform using simple, 2D image correlation. The process also uses color information to eliminate parts of the image from consideration.

The present object recognition system and process must first be trained to recognize an object it is desired to find in an image that may contain the object. Specifically, the generation of training images begins with capturing a color image that depicts a face or surface of interest on the object it is desired to recognize. A separate image is made for each such surface of the object. Although not absolutely required, each of these images is preferably captured with the normal vector of the surface of the object approximately pointed at the camera—i.e., as coincident with the camera's optical axis as is feasible. The surface of the object in each of the images is next identified. Preferably, the surface of the object is identified manually by a user of the present system. For example, this can be accomplished by displaying the image on a computer screen and allowing the user to outline the surface of the object in the image, using for example a computer mouse. The pixels contained within the outlined portion of the image would then be extracted. The extracted portion of each image becomes a base training image. Each base training image is used to synthetically generate other related training images showing the object in other orientations and sizes. Thus, the user is only required to capture and identify the object in a small number of images.

For each of the base training images depicting a surface of interest of the object, the following procedure can be used to generate synthetic training images. These synthetic training images will be used to train the object recognition system. An image of the object is synthetically generated in each of a prescribed number of orientations. This can be accomplished by synthetically pointing the object's surface normal at one of a prescribed number (e.g., 31) of nodes of a tessellated hemisphere defined as overlying the object's surface, and then simulating a paraperspective projection representation of the surface. Each node of the hemisphere is preferably spaced at the same prescribed interval from each adjacent node (e.g., 20 degrees), and it is preferred that no nodes be simulated within a prescribed distance from the equator of the hemisphere (e.g., 20 degrees). Additional synthetic training images are generated by synthetically rotating each of the previously simulated training images about its surface normal vector and simulating an image of the object at each of a prescribed number of intervals (e.g., every 20 degrees).

Additional training images can be generated by incrementally scaling the synthesizing training images of the object. This would produce synthesized training images depicting the object at different sizes for each orientation. In this way the scale of the object in the image being search would be irrelevant once the system is trained using the scaled training images.

Once the synthetic training images are generated, each is abstracted for further processing. The preferred method of abstraction involves characterizing the images as a collection of edge points (or more particularly, pixels representing an edge in the image). The resulting characterization can be thought of as an edge pixel image. The edge pixels in each synthetic training image are preferably detected using a standard Canny edge detection technique. This particular technique uses gray level pixel intensities to find the edges in an image. Accordingly, as the base images and the synthetically generated training images are color images, the overall pixel intensity component (i.e., R+G+B) for each pixel is computed and used in the Canny edge detection procedure.

A binary raw edge feature is generated for each edge pixel identified in the synthetic training images by the edge detection procedure. A binary raw edge feature is defined by a sub-window of a prescribed size (e.g., 7×7 pixels) that is centered on an edge pixel of the synthetic training images. Each edge pixel contained in the a feature is designated by one binary state, for example a "0", and the non-edge pixels are designated by the other binary state, for example a "1".

Typically, a very large number of raw edge features would be generated by the foregoing procedure (e.g., on the order of ½ million in tested embodiments). In addition to the problem of excessive processing time required to handle so many features, it is also unlikely that the actual features of the object's surface would be exactly reproduced in the generated feature due to noise. Further, poses of the object in an image could fall in between the synthetically generated poses. Accordingly, using the raw edge features themselves to identify an object in an image is impractical and potentially inaccurate. However, these problems can be overcome by quantizing the raw edge features into a smaller set (e.g., 64) of prototype edge features, which represent all the raw edge features.

The first part of the process involved with generating the aforementioned prototype edge features is to establish a set of arbitrary prototype edge features having the same prescribed size (e.g., 7×7 pixels) as the raw edge features. These initial prototype edge features are arbitrary in that the pixels in each are randomly set at one of the two binary states—for example a "0" to represent an edge pixel and a "1" to represent a non-edge pixel. Next, each raw edge feature is assigned to the most similar initial prototype feature. It is noted that to reduce processing time, it is believed that some smaller number of the raw edge features could be used to the generate the final set of prototype features, rather than every raw feature, and still achieve a high degree of accuracy. For example, in tested embodiments of the present invention, 10,000 randomly chosen raw edge features were employed with success. The process of assigning raw edge features to the most similar initial prototype edge feature involves first computing a grassfire transform of each raw feature and each of the initial prototype features. The grassfire transform essentially assigns an integer number to each pixel location of a feature based on if it is an edge pixel or not. If the pixel location is associated with an edge pixel, then a "0" is assigned to the location. However, if the pixel location represents an non-edge pixel, then a number is assigned (e.g., 1–7 for a 7×7 feature) based on how far away the location is from the nearest edge pixel.

Once the grassfire transforms have been produced, a "distance" between each grassfire transformed raw edge feature and each grassfire transformed prototype edge feature is computed. This distance indicates how closely two features match. The distance is computed by, for each pair of raw and prototype features compared, first identifying all the pixel locations in the raw edge feature that correspond to edge pixels in the prototype feature (i.e., a "0" in the grassfire transform thereof), and then summing the grassfire values assigned to the identified locations to create a raw feature grassfire sum. In addition, all the pixel locations in the prototype feature that correspond to edge pixels of the raw feature are identified and the grassfire values associated therewith are summed to produce a prototype feature grassfire sum. The raw feature grassfire sum is added to the prototype feature grassfire sum to produce the "distance" between the compared raw feature and prototype feature.

Each raw edge feature is assigned to the initial prototype edge feature to which it has the minimum computed distance among all the prototype features compared to it. In this way all the raw edge features involved are assigned to one of the initial prototype features.

The next phase of the prototype edge feature generation process is to revise each of the initial prototype features to be more representative of all the raw edge features assigned thereto. This is accomplished for each prototype feature in turn by first computing the mean number of edge pixels in the raw edge features assigned to the prototype feature. This mean is the sum of the number of edge pixels in the assigned raw edge features, divided by the number of assigned raw features. The grassfire values associated with each respective pixel location of the assigned raw edge features are summed to create a summed grassfire feature. A so-called level sets approach is then used, which begins by identifying the pixel locations in the summed grassfire feature that have the lowest grassfire value and to record how many of these pixel locations there are. The pixel locations of the summed grassfire feature that have the next higher grassfire value are then identified and the quantity is recorded. Next, the number of pixel location having the lowest grassfire value is added to the number of location having the next higher grassfire value to produce a combined pixel location sum. The number of pixel locations having the lowest grassfire value and the combined pixel location sum are compared to the previously computed edge pixel mean. If the number of pixel locations having the lowest grassfire value is closer to the edge pixel mean than the combined pixel location sum, then the former's pixel locations are designated as prototype edge pixels in the new version of the prototype edge feature under consideration. Each of the prototype edge pixels is assigned a first binary value (e.g., "0"), and all the other pixel locations in the new prototype feature are assigned the other binary value (e.g., "1").

If, however, the combined pixel location sum is closer to the edge pixel mean, but the mean is still less than this sum, then the pixel locations associated with the sum are designated as prototype edge pixels in the new version of the prototype edge feature. Again, each of the prototype edge pixels is assigned the aforementioned first binary value (e.g., "0"), and all the other pixel locations in the new prototype feature are assigned the other binary value (e.g., "1").

If, however, the combined pixel location sum is closer to the edge pixel mean, and the mean is greater than the sum, then additional actions are required to produce the new prototype edge feature. Namely, the pixel locations in the summed grassfire feature that have the next higher, previously unconsidered, grassfire value are identified, and their quantity is recorded. This new quantity is added to the last computed combined pixel location sum to produce a current version thereof. The previous version of the combined pixel location sum and the current version of the combined pixel location sum are then compared to the edge pixel mean. If the previous version of the combined pixel location sum is closer to the edge pixel mean than the current version of the combined pixel location sum, then the pixel locations associated with the previous sum are designated as prototype edge pixels in a current version of the prototype edge feature under consideration. Once again, each of the prototype edge pixels is assigned the first binary value (e.g., "0"), and all the other pixel locations in the current prototype feature are assigned the other binary value (e.g., "1"). If, on the other hand, the current version of the combined pixel location sum is closer to the edge pixel mean, but the mean is still less than this sum, then the pixel locations associated with the current sum are designated as prototype edge pixels in the current version of the prototype edge feature, and assigned the aforementioned first binary value (e.g., "0"), while all the other pixel locations in the new prototype feature are assigned the other binary value (e.g., "1"). However, if the current combined pixel location sum is closer to the edge pixel mean, and the mean is greater than the sum, the process described in this paragraph must be repeated, until a new version of the prototype edge feature is established.

Once a new version of each of the prototype edge features has been establish the entire procedure of assigning each raw edge feature to the most similar prototype edge feature and revising the prototype edge features is repeated using the new versions of the prototype features, until the newly generated prototype features do not change from those generated in the previous iteration. At that point, the last generated prototype edge features are declared to be the final prototype features.

The next phase of the training process for the present object recognition system and process is to create an indexed version of each synthetic training image. This essentially entails first assigning an integer index number to each of the final prototype edge features. Preferably, these numbers will run from 1 to $n_p$, where $n_p$ is the total number of prototype edge features. Each raw edge feature associated with each of the edge pixel training images is compared to each of the final prototype edge features using the previously described grassfire transform-distance procedure to identify which of the prototype features is most similar to the raw edge feature under consideration. Once the closest prototype edge feature is found, the index number assigned to that prototype feature is assigned to the edge pixel location associated with the raw edge feature to create a pixel of the indexed training image containing the edge pixel under consideration. This process is repeated until an index number associated with one of the prototype edge features is assigned to every edge pixel location in every synthetic training image. The result is a set of indexed training images.

As described above, each edge pixel now has a prototype index number assigned to it to form the indexed training images. In addition, an offset vector is also assigned to each raw edge pixel of the training images. Each vector is generated by first computing the pixel coordinates of a prescribed reference point on the object's surface depicted in an associated synthetic training image. For example, the centroid of the object's surface could be used as the prescribed reference point. Next, a 2D offset vector going from the pixel coordinates of the edge pixel to the pixel coordinates of the prescribed reference point is computed. This vector defines the direction and distance from the edge pixel to the prescribed reference point.

The offset vectors are used to define a Hough kernel for each prototype edge feature. Specifically, for each prototype edge feature, every offset vector associated with an edge pixel to which the prototype feature has been assigned (as evidenced by the prototype index number of the feature) is identified in every indexed training image. Each of the identified offset vectors is designated as an element of a Hough kernel for the prototype edge feature. The foregoing process is then repeated for each of the remaining prototype edge features to generated a Hough kernel for each. The Hough kernel itself can be though of as an "image" having a central pixel location from which all the offset vectors associated therewith originate. Each of the vectors defines a pixel location in this image coinciding to its termination point, which corresponds to the location of the above mentioned reference point in relation to this indexed edge pixel. It is noted that more than one offset vector may terminate at the same pixel location. For purposes of the present invention, the Hough kernel is characterized as an image where the pixel values for each pixel location correspond to a number or vote count indicating how many offset vectors terminated at that pixel location.

As a result of the training process, a set of prototype edge features has been established and a Hough kernel has been created for each of these prototype features. These elements will be used to recognize objects in images of a scene in which it is believed the object may exist, as will now be described.

The object recognition phase begins by obtaining an image it is desired to search for the object that the present system has been trained to recognize. This image will be referred to as an input image. The input image is first processed to generate an indexed version thereof. This essentially entails abstracting the input image in the same way as the initial images using an edge detection technique (which is preferably the Canny edge detection process). Binary raw edge features are then generated for each of the identified edge pixels using the same procedure described in connection with the training images, including using the same size sub-window (e.g., 7×7 pixels). Each of the raw edge features generated from the input image are compared to each of the prototype edge features using the previously described grassfire transform-distance procedure to identify which prototype edge feature is most similar to each respective raw edge feature. Next, for each edge pixel in the input image, the index number associated with the prototype edge feature identified as being the closest to the raw edge feature associated with the edge pixel under consideration is assigned to the corresponding edge pixel location to create an indexed input image. Once a prototype index number has been assigned to each corresponding edge pixel location, the indexed input image is ready to be used in the next part of the object recognition process. Namely, producing a voting image from the indexed input image.

A voting image in the context of the present object recognition system and process is an image whose pixels indicate the number of the aforementioned offset vectors that terminated at the pixel. The significance of this will become apparent in the following description. The first action involved in producing a voting image is to, for each prototype index number, identify each pixel in the indexed input image that has been assigned the prototype index number under consideration. Once this has been done, a series of "equal-value" index images are created—one for each prototype index number. A equal-value index image is the same size as the indexed input image and has a first binary pixel value (e.g., "0") assigned to every pixel location except those that correspond to the pixels of the indexed input image having the prototype index number to which the particular equal-value index image has been dedicated. The latter case, the second binary pixel value (e.g., "1") is assigned to the location. Thus, the pixel locations assigned the second binary pixel value (e.g., "1") correspond to those locations in the indexed input image exhibiting the index number to which the equal-value index image has been dedicated. All the other pixel locations in the equal-value index image are set to the first binary pixel value (e.g., "0"). In other words, each equal value index image only identifies the location of edge pixels associated with one particular prototype edge feature. Noting that a Hough kernel is characterized as an image having a central pixel location and pixel values indicative of the number of offset vectors terminating at each pixel location in the image, the next action is to superimpose the central point of the Hough kernel associated with the prototype edge feature assigned the index number to which a equal-value index image has been dedicated, onto each of the identified pixel locations of the equal-value index image. For each pixel location of the equal-value index image under consideration, an integer number representing the sum of the vote counts from the individual superimposed Hough kernel pixels is assigned to a corresponding pixel location of an initial voting image associated with the equal-value index image. A similar initial voting image is produced for each prototype edge feature. Once complete, the individual initial voting images are combined to form a final voting image. This is accomplished by respectively summing the numbers assigned to each corresponding pixel location of all the initial voting images and assigning the sum to that location of the final voting image.

In order to reduce the processing required for the foregoing procedures associated with creating the indexed input image and its associated final voting image, an optional procedure can be performed to eliminate pixels from the input image that cannot possible be part of the object. Eliminating these pixels can make the object recognition more accurate by preventing pixel locations that may have large vote numbers due to noise or the coincidence of corresponding to an extraneous object in the input image that has a similar structure to the object being sought. Essentially, the elimination process uses pixel color to decide if a pixel location can be associated with the object being sought or not.

The elimination process begins with the establishment of a 256×256×256 Boolean lookup table (LUT). Each cell of this table represents a unique RGB combination and the table as a whole covers all possible RGB levels (i.e., RG&B values each range from 0 to 255). Next, the RGB level of every pixel associated with the extracted object in the base training image is identified. Each unique object-related RGB level is normalized (by dividing it by $\sqrt{R^2+G^2+B^2}$) to eliminate the effects of illumination intensity variations and shadows. An acceptance region of a predetermined size is defined around each of these normalized object-related RGB levels. Then, each of the possible RGB levels as defined in the LUT are also normalized. Any RGB level in the table whose normalized values do not fall within one of the acceptance regions of the normalized object-related RGB levels is eliminated from consideration. This is preferably done by setting the cells in the LUT associated with such values at a first binary value (e.g., "1"). In addition, all the cells of the table associated with RGB levels that do fall within one of the established acceptance regions would be set to the other binary value (e.g., "0") in the LUT to indicate it is a color consistent with the object being sought. Thus, the net result is a binary LUT that identifies which colors (i.e., RGB combinations) are consistent with the object being sought.

Once the binary LUT has been created, the next phase in the elimination process is to identify the RGB level of every pixel in the input image. Then, every pixel location of the input image that has a RGB level not indicated in the binary LUT as being a color consistent with the object being sought (e.g., has a value of "1" in the LUT) is identified. If it is determined that the RGB level of the pixel in the input image is not an object-related color, then the corresponding pixel location in the previously created edge pixel input image is eliminated from consideration by setting its value to the second binary pixel value (e.g., "1"), thereby indicating no edge at that point (regardless of if the pixel actual depicts and edge or not).

While the size of the aforementioned acceptance region could be set to a default setting (e.g., 5 RGB units in all directions), it is preferable that this parameter be user-specified so that the elimination process can be fine tuned to the particular scene been analyzed. One way to achieve this goal would be through an interactive process with the user. For example, the foregoing procedure of establishing a binary LUT could be performed in the training phase of the object recognition process, as it employs the extracted region of the model image (i.e., the base training image) which was produced with the user's help at that time. Once the binary LUT has been establish using a default setting (or an initial user-specified setting) for the acceptance region size, the results could be displayed to the user. This can be accomplished by, for example, assigning the appropriate binary value listed in the binary LUT to each pixel of each of the initial images of the scene that were used to generate the training images. Each of the binary-converted initial images would then be displayed to the user. These images would show all the pixels having a non-object related color in one color (e.g., black), and all the object-related colors in another color (e.g., white).

If the user determines that the binary-converted image does not show a sufficient number of the pixels associated with the object's surface of interest in the same color, he or she could adjust the acceptance region size. A new binary LUT would be created, and then a new binary-converted image displayed to the user. This interactive process would continue until the user determines that the selected acceptance region size results in a sufficient number of the pixels associated with the object's surface of interest being displayed in the same color. At that point the selected acceptance region size is designated as the final size and later used in the previously-described elimination process. It is noted that the display of a sufficient number of the pixels associated with the object's surface of interest would preferably equate to the situation where a substantial number of the pixels associated with the object's surface of interest are displayed in the same color, while at the same time as many of the pixels of the binary-converted image that do not depict the surface of interest of the object as possible are shown in the other color. This would ultimately mean that a maximum number of the non-object related pixels in the voting image would be eliminated from consideration.

It is expected that the pixel in the final voting image associated with an input image containing the object being sought will have the largest vote number at a location coinciding with the previously mentioned prescribed reference point on the surface of the object. Thus, to determine if the object being sought is depicted in the input image, and if so where, it must first be ascertained if any of the pixels in the final voting image have vote counts associated therewith that equals or exceeds a prescribed detection threshold.

This detection threshold is chosen to provide a high degree of confidence that any vote count equaling or exceeding it could be the prescribed reference point of the object being sought. If none of the pixels in the final voting image have a vote count that equals or exceeds the detection threshold, then is declared that the object of interest is not depicted in the input image. If, however, one or more of the pixels in the final voting image do equal or exceed the detection threshold, then it is declared that the object is present in the input image. Further, the location of the pixel in the final voting image having the highest vote count is identified and the corresponding pixel location in the input image is designated as the prescribed reference point of the object.

While the aforementioned detection threshold could be set to a default setting, it is preferable that this parameter be user-specified so that the object recognition process can be fine tuned to the particular object being sought. One way to accomplish this task would be through an interactive process with the user. For example, at the end of the training phase, it would be possible to run the foregoing object recognition process on the initial images that were used to produce the training images. Alternately, new images of the scene containing the object of interest at a known location, could be employed. Essentially, the detection threshold would be established by first performing the previously described object recognition process on the aforementioned model image, or a new image containing the object's surface of interest, using either a default detection threshold value or one specified by the user as the initial threshold. The pixels of the final voting image produced during the object recognition process that equal or exceed the initial detection threshold would be highlighted in a manner apparent to the user in the model or new image which is displayed to the user. The user would then determine if a significant number of pixels not depicting the object's surface of interest are highlighted in the displayed image. If so, then the user would provide a revised detection threshold that is higher than the last-employed threshold, and the object recognition process would be repeated using the model or new image and the revised threshold. If, on the other hand, the user discovers that very few or no pixels are highlighted in the part of the image known to contain the object's surface of interest, then the user would provide a revised detection threshold that is lower than the last-employed threshold, and the process would be rerun as before. This interactive procedure would continue until the user decides that a sufficient number of pixels are highlighted in the area containing the object's surface of interest, while as few of the pixels not depicting the surface as possible are highlighted. At that point, the last-employed threshold would be designated as the final detection threshold and used in recognizing objects in future input images of the scene.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIG. 18A is an example input image.

FIG. 18B is a binary-converted image of the input image of FIG. 18A that shows pixels associated with an object-related color in white and pixels associated with non-object related colors in black.

FIG. 18C is an example of an edge pixel image for the input image of FIG. 18A.

FIG. 18D is an example of a voting image for the input image of FIG. 18A.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Before providing a description of the preferred embodiments of the present invention, a brief, general description of a suitable computing environment in which the invention may be implemented will be described. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
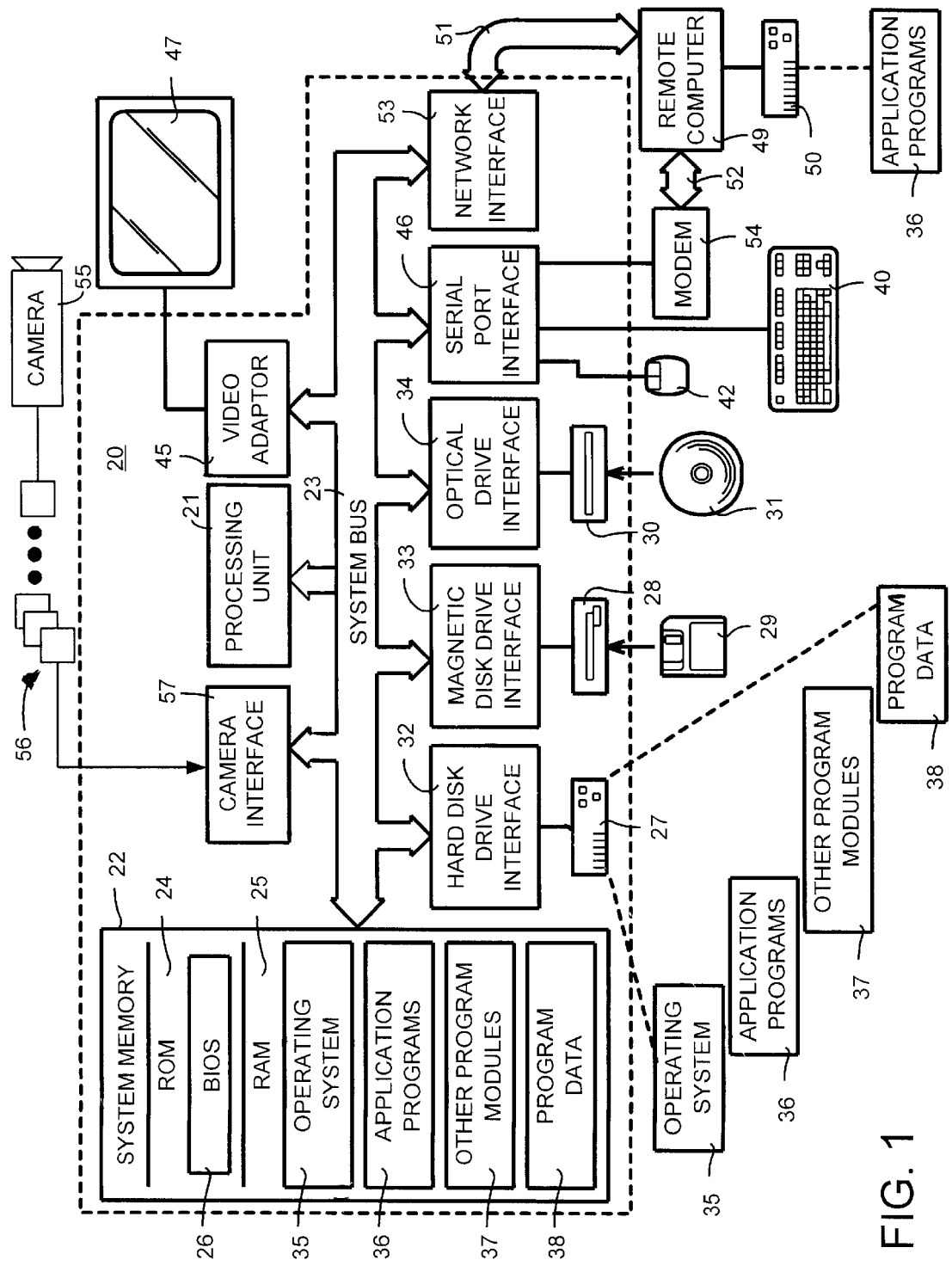
FIG. 1 is a diagram depicting a general purpose computing device constituting an exemplary system for implementing the present invention.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the object recognition system and process according to the present invention.

Figure 2:
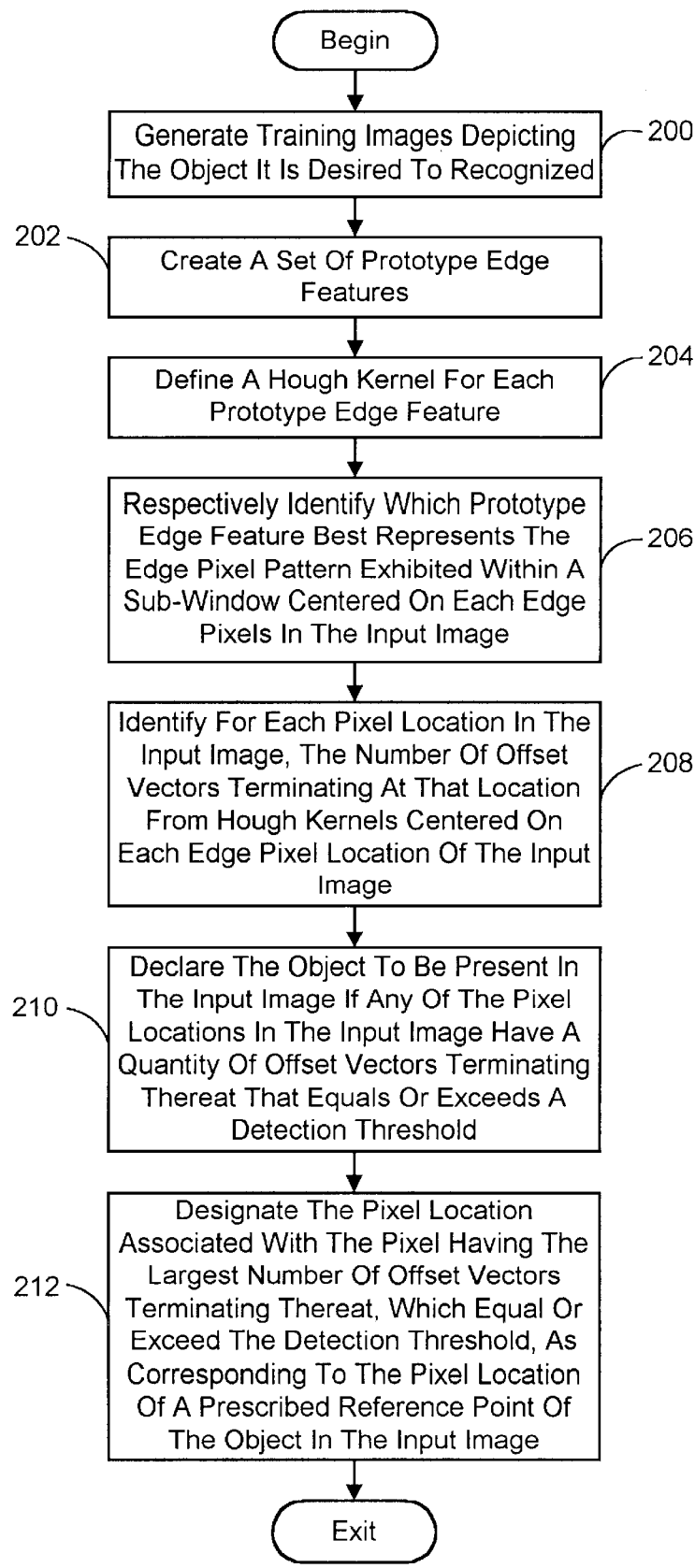
FIG. 2 is a flow chart diagramming an overall process for recognizing objects in an image according to the present invention.

Referring to FIG. 2, the overall object recognition process generally involves first generating training images depicting the object it is desired to recognized in the input image of the scene (process action 200). A set of prototype edge features which collectively represent the edge pixel patterns encountered within a sub-window centered on each pixel depicting an edge of the object in the training images is then created as indicated by process action 202. As will be discussed in detail later in this description, the set of prototype edge features is generally created by detecting edge pixels in each training image and producing an edge pixel training image for each training image. A raw edge feature is defined for each edge pixel in each of the edge pixel training images, where a raw edge feature is a sub-window of a prescribed size (e.g., 7×7 pixels) that is centered on an edge pixel. A prescribed number of prototype edge features (e.g., 64) are created, each of which represents a group of the raw edge features. The next process action 204 involves defining a Hough kernel for each prototype edge feature. A Hough kernel for a particular prototype edge feature is generally defined by a set of offset vectors representing the distance and direction, from each edge pixel having an associated sub-window exhibiting an edge pixel pattern best represented by the prototype edge feature to a prescribed reference point on the surface of the object under consideration. This predefined reference point could be, for example, the centroid of the object's surface. The offset vectors are represented in the Hough kernel as originating at a central point of the kernel. The last action completes the training phase of the process. The first action taken in the object recognition phase of the process is to respectively identify which prototype edge feature best represents the edge pixel pattern exhibited within the sub-window centered on each edge pixel in an input image being searched for the object (process action 206). Then, for each pixel location in the input image, the number of offset vectors terminating at that location from Hough kernels centered on each edge pixel location of the input image is identified (process action 208). The Hough kernel centered on each pixel location is the Hough kernel associated with the prototype edge feature best representing the edge pixel pattern exhibited within a sub-window centered on that input image edge pixel location. The object is declared to be to be present in the input image if any of the pixel locations in the input image have a quantity of offset vectors terminating thereat that equals or exceeds a detection threshold (process action 210). This detection threshold is indicative of the presence of the object. Finally, in process action 212, the pixel location associated with the pixel having the largest number of offset vectors terminating thereat, which equal or exceed the threshold, is designated as corresponding to the pixel location of the aforementioned prescribed reference point of the object in the input image. Each of these tasks will be described in detail in the sections that follow.

1. Training

The present object recognition system and process must first be trained to recognize an object it is desired to find in an image that may contain the object. While many object recognition routines require several carefully controlled training views of the object (e.g. on a motorized turntable) or detailed, manual feature selection, the present object recognition scheme only requires the user to outline the object of interest in one image for every unique face of the object. The training images for different poses are generated synthetically from the actual images.

1.1 Generating Training Images.

In modern object recognition, training is nearly always done on actual or simulated images of the object to avoid the labor-intensive process of constructing the models manually. Typically training images show the object in many different poses so the object model can cover all the anticipated appearances of the object. However, a normal consumer would have access to neither a renderable model of the object he or she wants to have recognized nor to a convenient means of presenting the object to the camera in many different positions and orientations. Thus, one goal of the present object recognition system is to require only that the user show a few images of the object to the training program.

Figure 3:
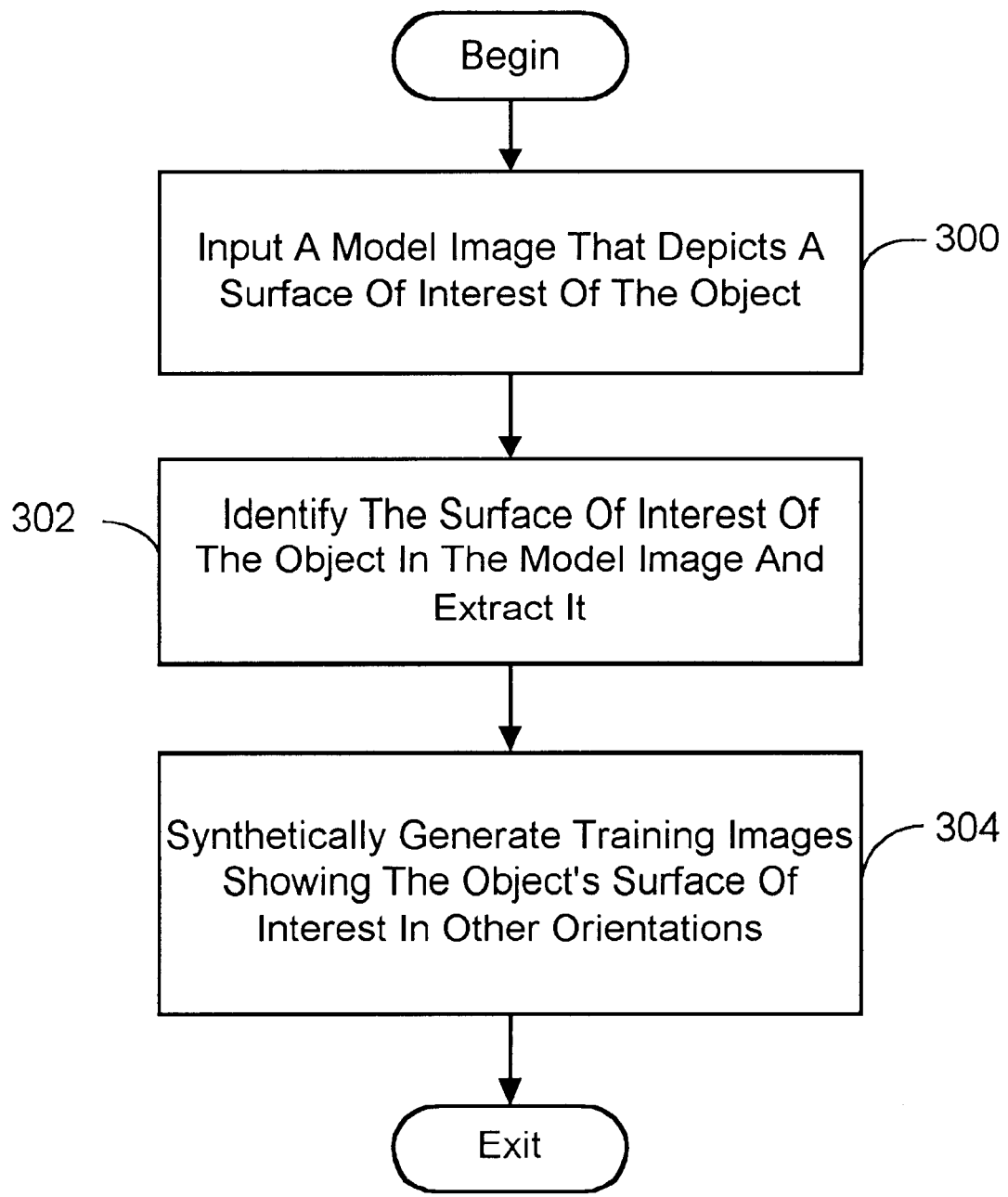
FIG. 3 is a flow chart diagramming a process for generating training images in accordance with the overall process of FIG. 2.

Specifically, referring to the flow diagram of FIG. 3, the generation of training images begins with inputting a single model image that depicts a face or surface of interest on the object it is desired to recognize (process action 300). A separate image is made for each such surface of the object. The images are preferably color digital images of a scene containing the object, such as could be obtained using a standard color video camera (although a photographic image which has been digitized and input into the present object recognition system could also be employed).

Figure 4:
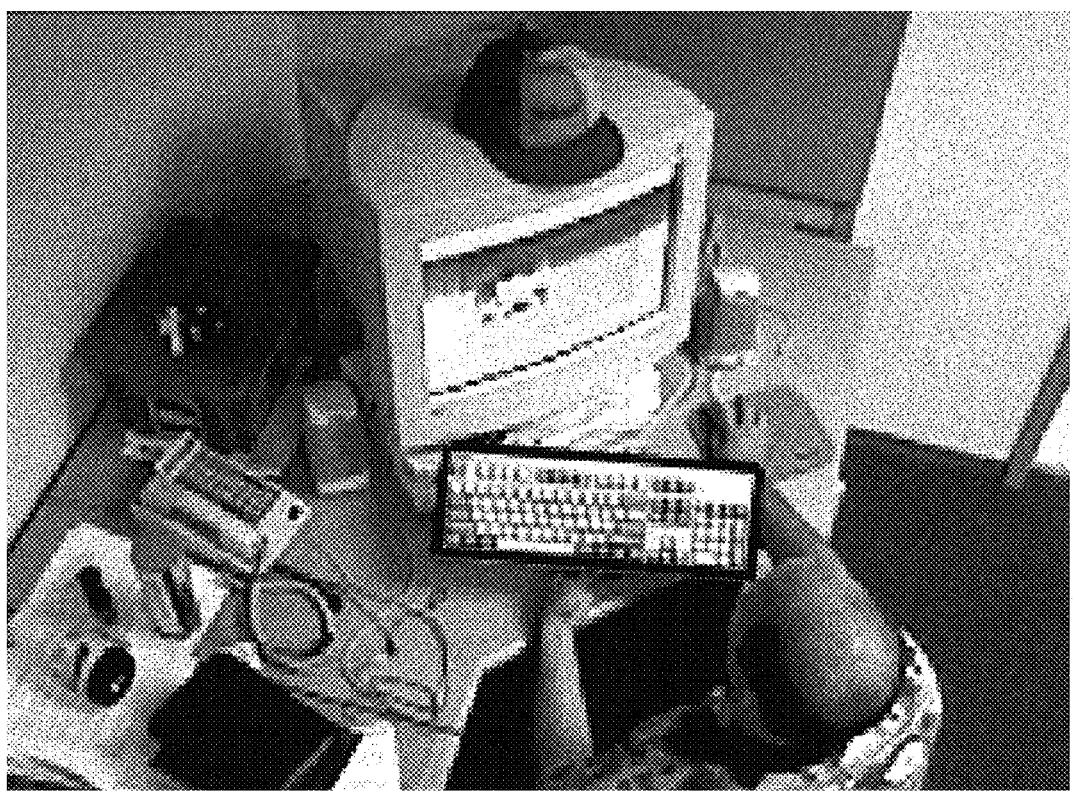
FIG. 4 is an exemplary image of a scene showing the surface of interest of a keyboard which has been outlined in the image by a user.

For each of the model training images, a base training image depicting the portion of the model image containing the surface of interest of the object is created. This is accomplished by identifying the surface of the object in each of the images and extracting it for further processing (process action 302). Preferably, the surface of the object is identified manually in the images by a user of the present system. For example, this can be accomplished by displaying the image on a computer screen and allowing the user to outline the surface of the object in the image, using for example a computer mouse, as shown in FIG. 4. The pixels contained within the outlined portion of the image would then be extracted. Existing image processing programs are available for performing the foregoing function, and any may be used. The extracted portion of each image becomes a base training image.

Referring to FIG. 3 once again, each base training image is used to synthetically generate other related training images showing the object in other orientations (process action 304), and optionally other sizes. Thus, the user is only required to capture and identify the object in a small number of images. It may even be just one image if the there is only one surface of interest on the object. For example, only the top surface of a computer keyboard is likely to be of interest for the purposes of object recognition, as this is the surface typically visible. Thus, the user would only be required to capture a single image of the scene containing the keyboard and to identify the keyboard in the image.

1.1.1 Generating Synthetic Images from a Base Training Image.

With the base training images extracted by the user, more views of the object at other orientations can be synthetically generated. This works best if the actual training image has the normal vector of the object's face roughly pointing at the camera. Thus, each of the original images of the scene is preferably captured with the normal vector of the surface of the object depicted as coincident with the camera's optical axis as is feasible.

Figure 5:
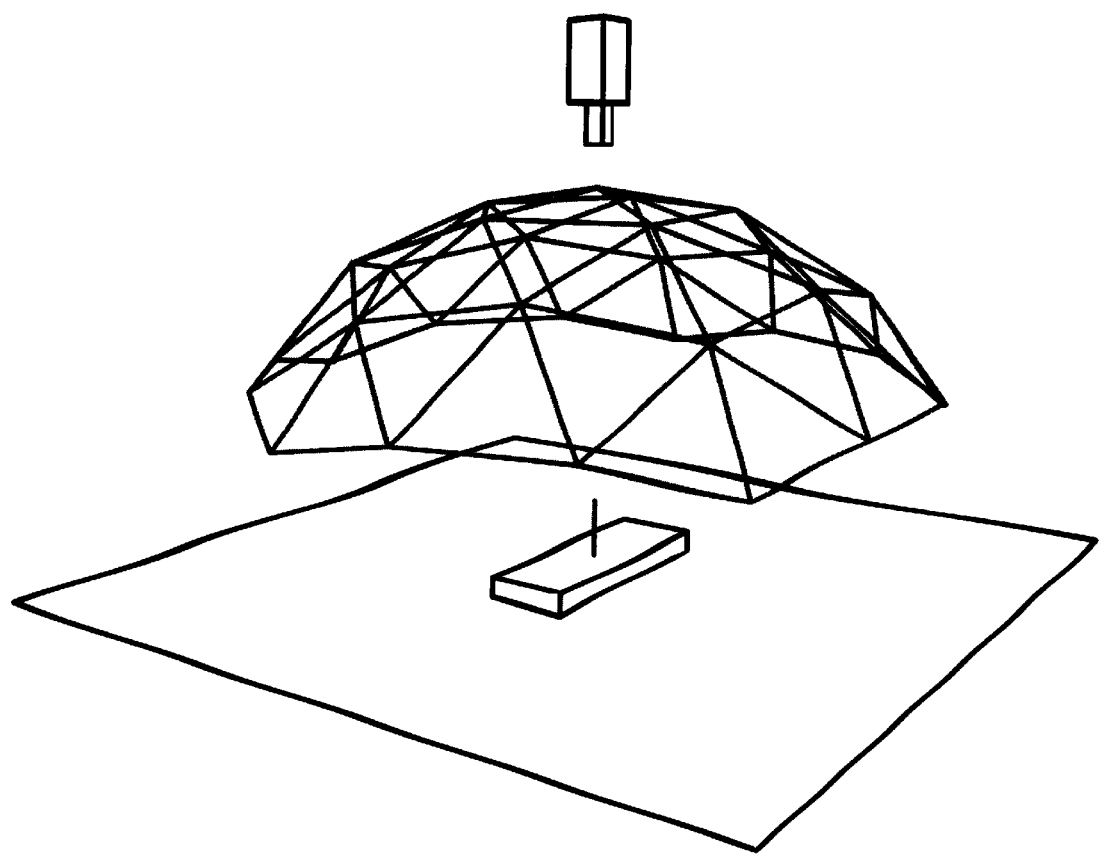
FIG. 5 is a diagram of a tessellated hemisphere overlying an object.
Figure 6A:
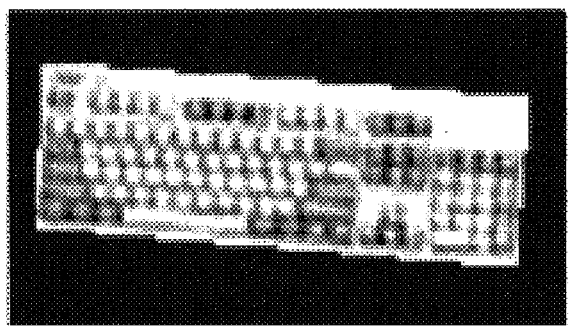
FIG. 6A is an example of a synthetic training image depicting a keyboard.

In general, rotation around the object's normal vector is simulated by simply synthetically rotating in the image plane, and out-of-plane rotation is simulated by synthetically pointing the object's face at a number of nodes (e.g., 31 in the tested embodiments) of a tessellated hemisphere as shown in FIG. 5. In these out-of-plane rotations, a simple paraperspective projection is simulated, meaning that the camera's focal length is not accounted for. The nodes of the hemisphere are spaced at approximately equal distances from one another. In the tested embodiments of the present invention, this spacing was chosen to be approximately 20 degrees. In addition, nodes within a prescribed distance (e.g., approximately 20 degrees) of the equator of the hemisphere are omitted to avoid nearly edge-on views. The training image is paraperspectively distorted for each node of the hemisphere and then the resulting image is rotated in the image plane in prescribed increments (e.g., 20 degree increments in the tested embodiments). Thus, in the tested embodiments, this gave 31×18=558 synthetic training images for each face of each object. One synthetic training image for the keyboard is shown in FIG. 6A.

Additional training images can be generated by incrementally scaling the synthesizing training images of the object, either up or down in size, or both. This would produce synthesized training images depicting the object at different sizes for each orientation. In this way the scale of the object in the image being search would be irrelevant once the system is trained using the scaled training images. The scaling increments employed to generate these scaled training images is chosen to ensure a good match to one of them regardless of the size of the object in the image being search. For example, it is believed a scaling increment of 0.1 (i.e., 10%) would be sufficient to achieve this goal. It is noted that rather than generating synthetic training images depicting the object of interest at different orientations and then generating scaled versions thereof, it would also be possible to produce the desired scaled training images by incrementally scaling the base training image and then synthesizing training images of the object at differing orientation for each of the scaled base images.

Figure 7:
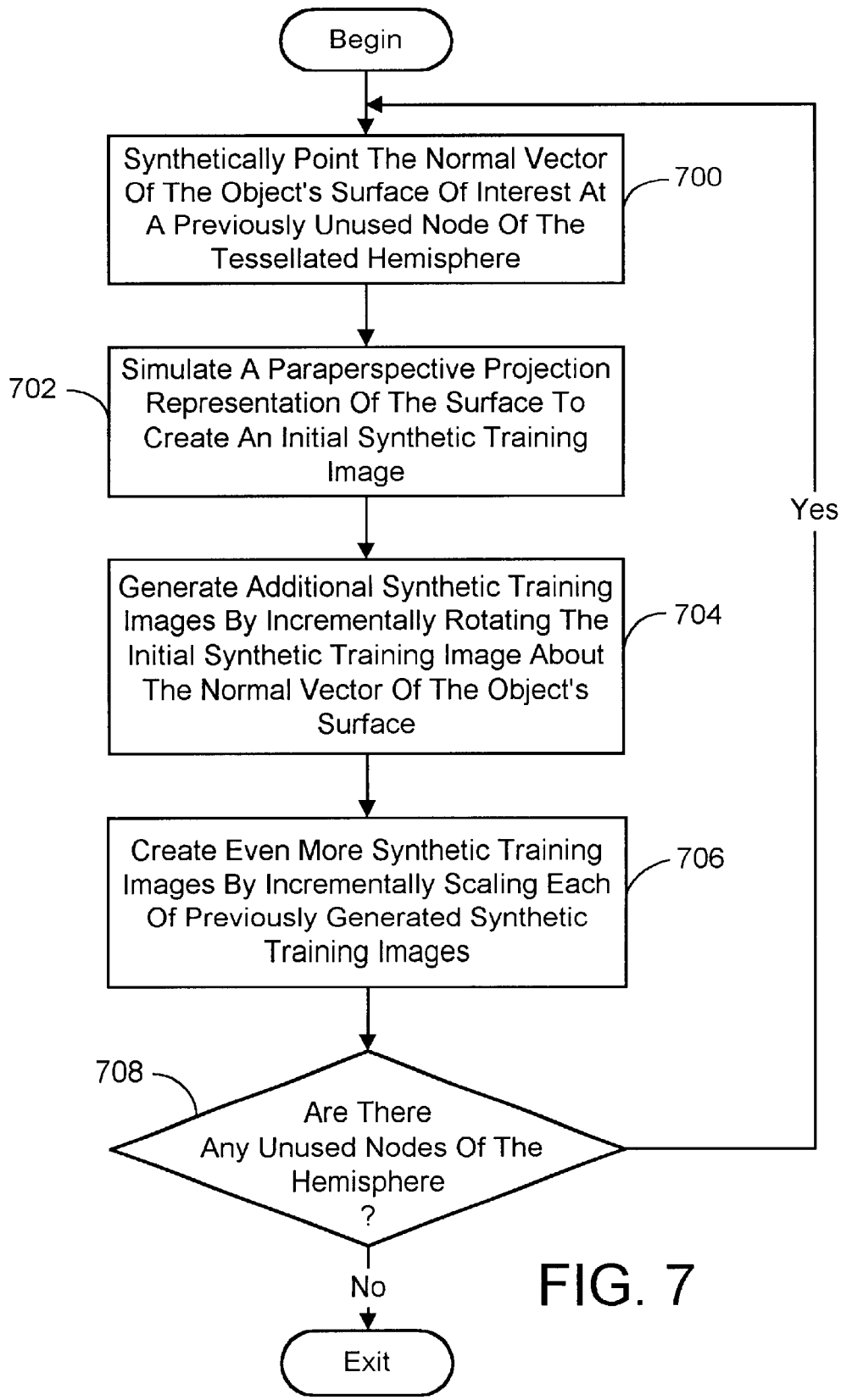
FIG. 7 is a flow chart diagramming a process for synthetically generating training images from a model image in accordance with the process of FIG. 3.

Thus, referring to the flow chart of FIG. 7, training images are synthesized from each base training image by first synthetically pointing the normal vector of the object's surface of interest at one of the nodes of the tessellated hemisphere (process action 700). A paraperspective projection representation of the surface is then simulated to create a synthetic training image (process action 702). Additional training images are then generated by synthetically rotating the aforementioned synthetic training image about the normal vector of the object's surface in an incremental manner, and creating a simulated training image of the surface at each increment (process action 704). Each of the generated synthetic training images could also be scaled incrementally to create even more training images at each scaling increment (process action 706). It is then determined if there are any more nodes of the hemisphere that have not been used to generate synthetic training images (process action 708). If there are remaining nodes, then process actions 700 through 706 are repeated for each. If no node remain, the procedure is terminated.

1.2 Abstracting Synthetic Training Images Using Edge Detection Techniques.

Figure 6B:
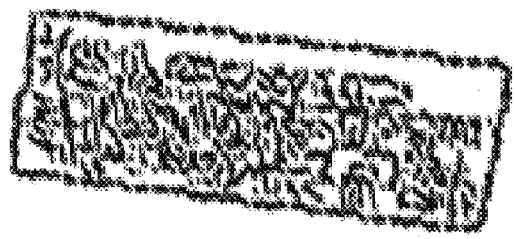
FIG. 6B is an edge pixel image showing the edge pixels detected on the synthetic training image of FIG. 6A.

Once the synthetic training images are generated, each is abstracted for further processing. The preferred method of abstraction involves characterizing the images as a collection of edge points (or more particularly, pixels representing an edge in the image). The resulting characterization can be thought of as an edge pixel image, where each edge pixel has one binary value (e.g., "0"), and each non-edge pixel has the other binary value (e.g., "1"). The edge pixels in each synthetic training image are preferably detected using a standard Canny edge detection technique. This particular technique uses gray level pixel intensities to find the edges in an image. Accordingly, as the base images and the synthetically generated training images are preferably color images, the overall pixel intensity component (i.e., R+G+B) for each pixel is computed and used in the Canny edge detection procedure. FIG. 6B shows the edges detected on one of the synthetic training images.

1.3 Generating Raw Edge Features.

A binary raw edge feature is generated for each edge pixel identified in the synthetic training images by the edge detection procedure. A binary raw edge feature is defined by a sub-window of a prescribed size (e.g., 7×7 pixels) that is centered on an edge pixel of the synthetic training images. These raw features are designated as $f_i(x,y)$, with $f_i(x,y) \in [0, 1]$, $x,y \in [0,1,2, \ldots l_f-1]$, $l_f=7$ (in the tested embodiments using a 7×7 sub-window), $i \in [1,2,3, \ldots n_f]$, and $n_f$ equal to the number of edge points or pixels in all the training images for a particular surface of a particular object. Thus, each edge pixel contained in the feature is designated by one binary state, for example a "0", and the non-edge pixels are designated by the other binary state, for example a "1".

1.4 Assigning an Offset Vector to Each Raw Edge Feature.

For each raw feature $f_i(x,y)$ a 2D offset vector $\overline{c}_i$ is also recorded going from the pixel coordinates of the feature's center on the training image to the pixel coordinates of the object's previously selected reference point (e.g., the centroid of the surface of the object depicted in the training image). The elements of each offset vector are preferably rounded to the nearest integer to save memory space. This vector defines the direction and distance from the center pixel to the prescribed reference point, and is assigned to each raw edge feature. As will be described later, these vectors are used to accumulate evidence for the location of the reference point of the object in an image.

1.5 Generating a Set of Prototype Edge Features.

It is noted that in the tested embodiments using the top surface of a keyboard as the surface of interest, each synthetic training image for that surface produced about 1000 edge points. Thus, since there can be 558 training images for a surface of interest of each object (and considerably more if scaled images of the object are also synthesized), an $n_f$ of about ½ million or more would result. The ½ million raw features and their corresponding offset vectors cannot be used directly to locate the object in a new edge image. This is because the actual features are unlikely to ever be exactly reproduced due to image noise, in-between poses that were never trained on, and the effects of the object's surface relief that cannot be simulated from just one actual training view. In addition, looking for each of the ½ million features would make the program too slow.

The number of features can be reduced and noise tolerance added by quantizing the raw features into a prescribed number of "prototype" edge features using k-means clustering procedure. This is referred to as binary image quantization. In the tested embodiments, 64 prototype features were employed for the aforementioned surface of interest. Each raw feature from the associated training images maps to one of the binary prototype edge features. It is noted that each surface of interest of the object would be depicted in a separate base training image from which associated synthetic training images would be generated. A separate set of prototype edge features would be created for each of the object's surfaces of interest. In the remainder of the description of the present object recognition system and process, unless indicated otherwise, the procedures will address the processing of just one surface of interest of the object being sought. These procedures would be repeated for each additional surface of interest of the object, if one exists.

The k-means clustering procedure is used for vector quantization of the raw binary features. Generally, a k-means procedure iteratively finds a set of $n_p$ representative prototype features, where $n_p=64$ in the tested embodiments. It begins with a set of arbitrarily chosen prototype features. This set of arbitrary prototype edge features has the same prescribed size (e.g., 7×7 pixels) as the raw edge features and constitutes the initial prototype edge features. These initial features are arbitrary in that the pixels in each are randomly set at one of the two binary states—for example a "0" to represent an edge pixel and a "1" to represent a non-edge pixel. Each raw feature would next be assigned to the most similar initial prototype feature, giving a partition of $n_p$ groups. However, some smaller number of the raw edge features could be used in the foregoing process and in subsequent iterations to ultimately generate a final set of prototype features, rather than using every raw feature. It is believed that a high degree of accuracy could still be maintained using fewer features, while at the same time reducing processing time. For example, in tested embodiments of the present invention, 10,000 randomly chosen raw edge features were employed with success. The process of assigning each of the raw edge features employed to the most similar prototype feature (initial or otherwise) involves computing the similarity between the raw edge features and the prototype features. Next, the $n_p$ prototype features for the next iteration are computed as representative features from each of these $n_p$ groups. This action requires that a representative feature be computed from the raw edge features assigned to a current version of the prototype feature. Finally, the iterations continue until the partition stops changing.

Figure 8:
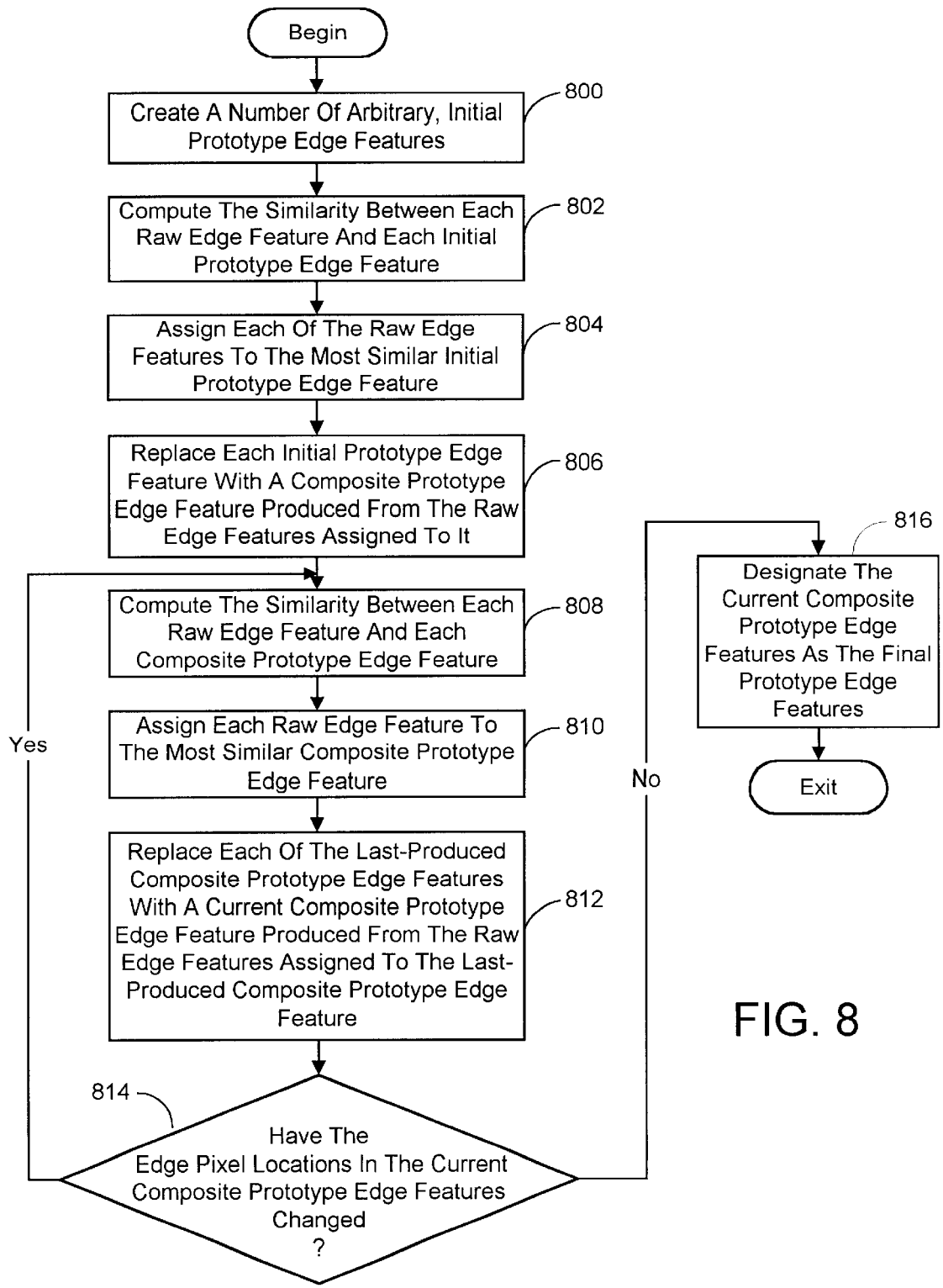
FIG. 8 is a flow chart diagramming a process for creating a set of prototype edge features in accordance with the overall process of FIG. 2.

This procedure is illustrated in the flow chart of FIG. 8. It begins by creating a number of arbitrary, initial prototype edge features (process action 800). The similarity between each of a prescribed number of the raw edge features (which may be all of them) and each initial prototype edge feature is then computed (process action 802). Each of the chosen raw edge features is assigned to the initial prototype edge feature to which it is most similar, as indicated in process action 804. Next, each initial prototype edge feature is replaced with a composite prototype edge feature produced from the raw edge features assigned to it (process action 806). The process preferably continues to refine the composite prototype edge features. This is generally accomplished by first computing the similarity between each of a prescribed number of the raw edge features and each composite prototype edge feature (process action 808). Each of the chosen raw edge features is then assigned to the composite prototype edge feature to which it is most similar (process action 810). Each of the last-produced composite prototype edge features is next replaced with a current composite prototype edge feature produced from the raw edge features assigned to the last-produced composite prototype edge feature (process action 812). This process (of actions 808 through 812) is repeated until the edge pixel locations in the current composite prototype edge features have not changed in comparison to the corresponding last-produced composite prototype edge features, as indicated by process action 814. Once no change is detected, the current composite prototype edge features are designated as the final prototype edge features (process action 816).

Two key elements of the foregoing k-means clustering procedure are a method to measure the similarity between features and a method to compute a representative feature of a group of features. For feature vectors whose elements are real valued, similarity is normally measured by distance (e.g. Euclidian, Mahalanobis), and the representative feature of a group is simply the group's centroid. However, for the binary feature templates employed in the present object recognition process, it was necessary to create new methods for measuring similarity and for computing a representative prototype. These new methods will now be described.

1.5.1 Measuring Similarity and Assigning Each Raw Edge Feature to the Most Similar Prototype Edge Feature.

Figure 9:
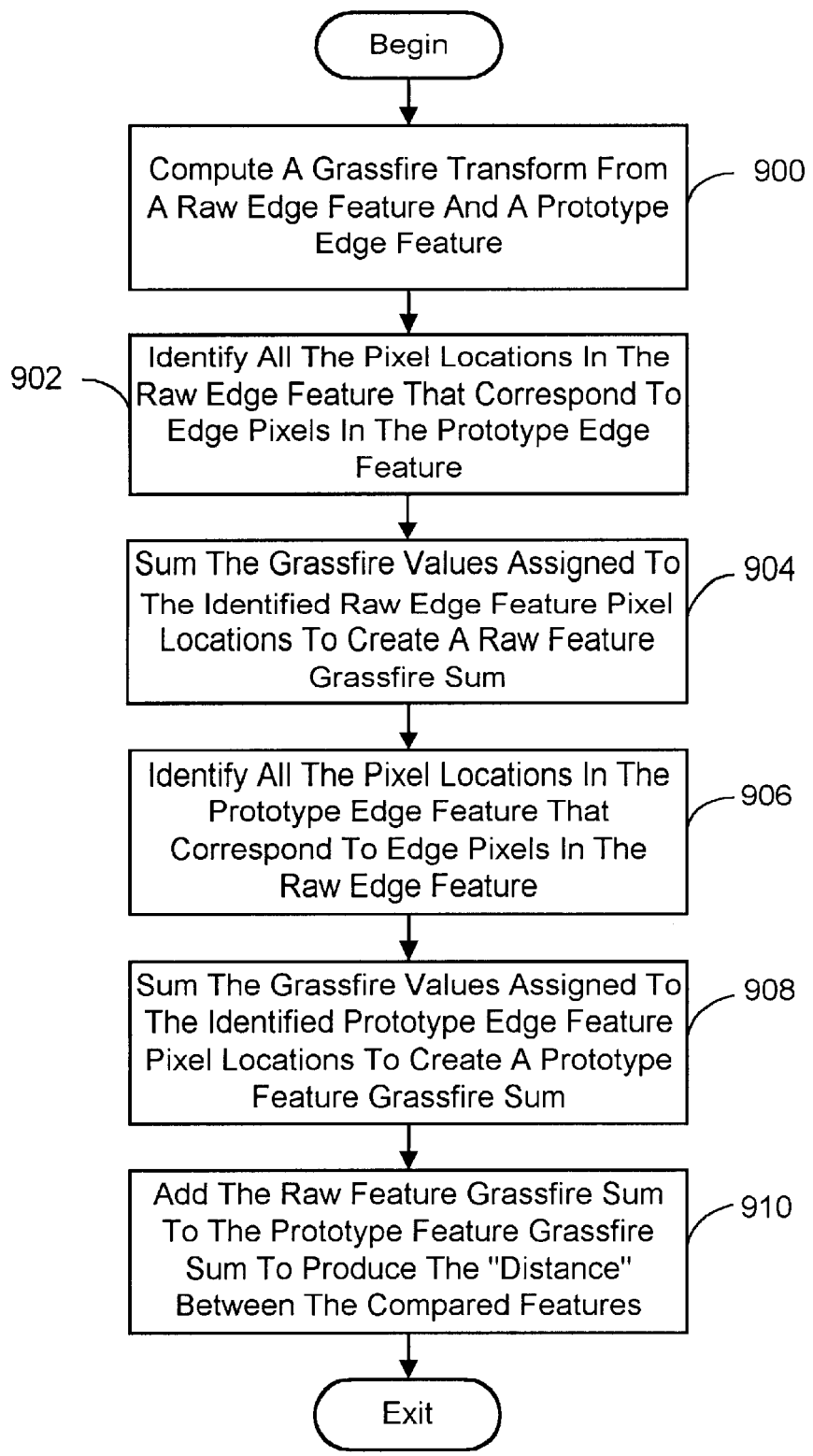
FIG. 9 is a flow chart diagramming a process for computing the similarity between a raw edge feature and a prototype edge feature in accordance with the process of FIG. 8.
Figure 10:
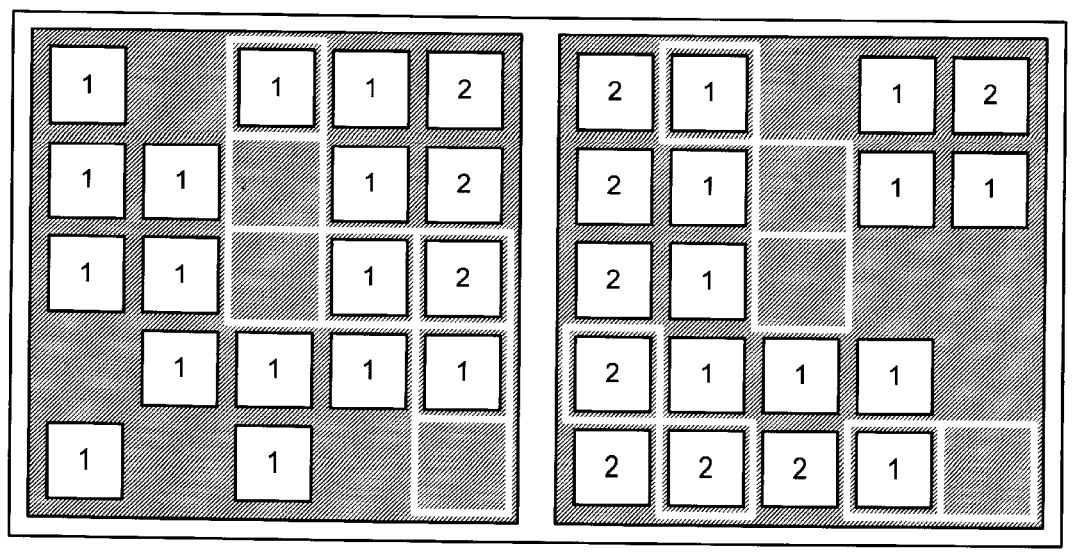
FIG. 10 is a diagram showing an example of a grassfire transform of a raw edge feature on the left and a prototype edge feature on the right.

The process of measuring similarity between features and assigning raw edge features to the most similar initial prototype edge feature involves first computing the distance between each raw feature and each prototype feature. Similarity is preferably measured with a Hausdorff-like distance. The Hausdorff distance for use on binary images was introduced by Huttenlocher et al. in reference [2]. Referring to the flow chart of FIG. 9, for a feature f(x,y) and prototype p(x,y) (e.g., both 7×7 binary), a grassfire transform is computed from each one, $G_f(x,y)$ and $G_p(x,y)$ using 8-connected neighbors (process action 900). FIG. 10 shows an example of the grassfire transform of a raw feature and a prototype feature.

A grassfire transform essentially assigns an integer number to each pixel location of a feature based on if it is an edge pixel or not. If the pixel location is associated with an edge pixel, then a "0" is assigned to the location. However, if the pixel location represents a non-edge pixel, then a number is assigned (e.g., 1–6 for a 7×7 feature) based on how far away the location is from the nearest edge pixel. Once the grassfire transforms have been produced, a "distance" between each grassfire transformed raw edge feature and each grassfire transformed prototype edge feature is computed. This distance indicates how similar the two features are to each other. Referring again to FIG. 9, the distance is computed by, for each pair of raw and prototype features compared, first identifying all the pixel locations in the raw edge feature that correspond to edge pixels in the prototype feature (i.e., a "0" in the grassfire transform thereof) as indicated in process action 902, and then in process action 904 summing the grassfire values assigned to the identified locations to create a raw feature grassfire sum. In addition, all the pixel locations in the prototype feature that correspond to edge pixels of the raw feature are identified (process action 906) and the grassfire values associated therewith are summed to produce a prototype feature grassfire sum (process action 908). The raw feature grassfire sum is added to the prototype feature grassfire sum to produce the "distance" between the compared raw feature and prototype feature (process action 910). As can be seen, if edge points from the two features coincide at the same location, they contribute zero to the distance. However, for those edge points that do not coincide, the grassfire value in the other image is taken as its contribution to the distance.

As indicated previously, each raw edge feature is assigned to the initial prototype edge feature to which it has the minimum computed distance among all the prototype features compared to it. In this way all the raw edge features involved are assigned to one of the initial prototype features.

It is noted that a grassfire-based method is better than a simple pixel-by-pixel comparison, because it accounts for the spatial closeness of edge pixels.

1.5.2 Computing Representative Prototype Edge Features.

The other computational element needed for the k-means algorithm is a way to compute a single prototype feature that is representative of a set of raw features. Generally, for a group of features F, the mean number of edge pixels $m_F$ and the sum of the raw features' grassfire transforms, $G_F(x,y)$, are both computed. In equation form, these are:

$$m_F = \frac{1}{n_F} \sum_{i: f_i \in F} \sum_x \sum_y f_i(x, y) \quad (1)$$

$$G_F(x, y) = \sum_{i: f_i \in F} G_{f_i}(x, y) \quad (2)$$

where $n_F$ is the number of raw features in group F.

Figure 11A:
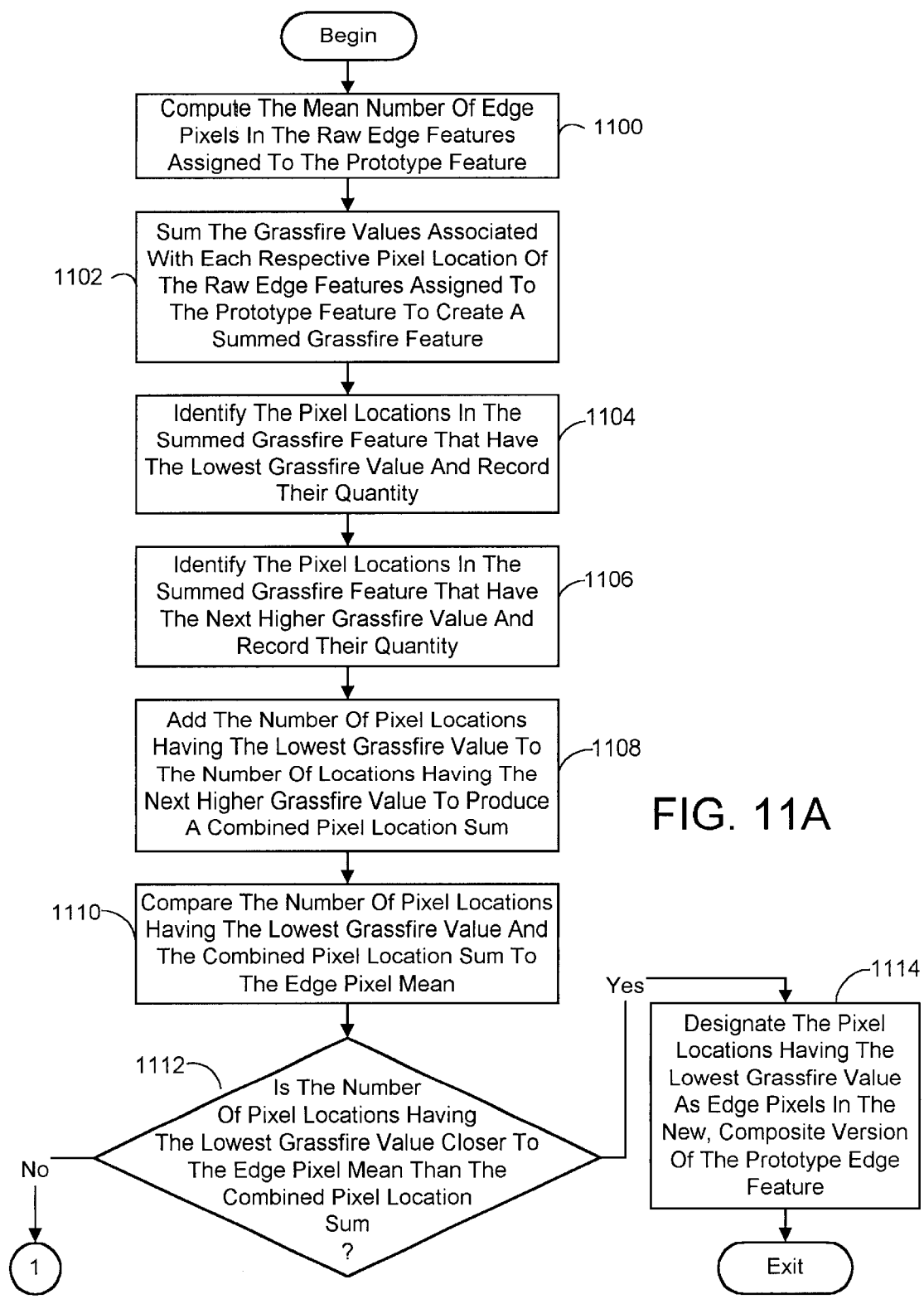
FIGS. 11A and 11B are a flow chart diagramming a process for combining a set of raw edge features to create a composite prototype edge feature in accordance with the process of FIG. 8.
Figure 11B:
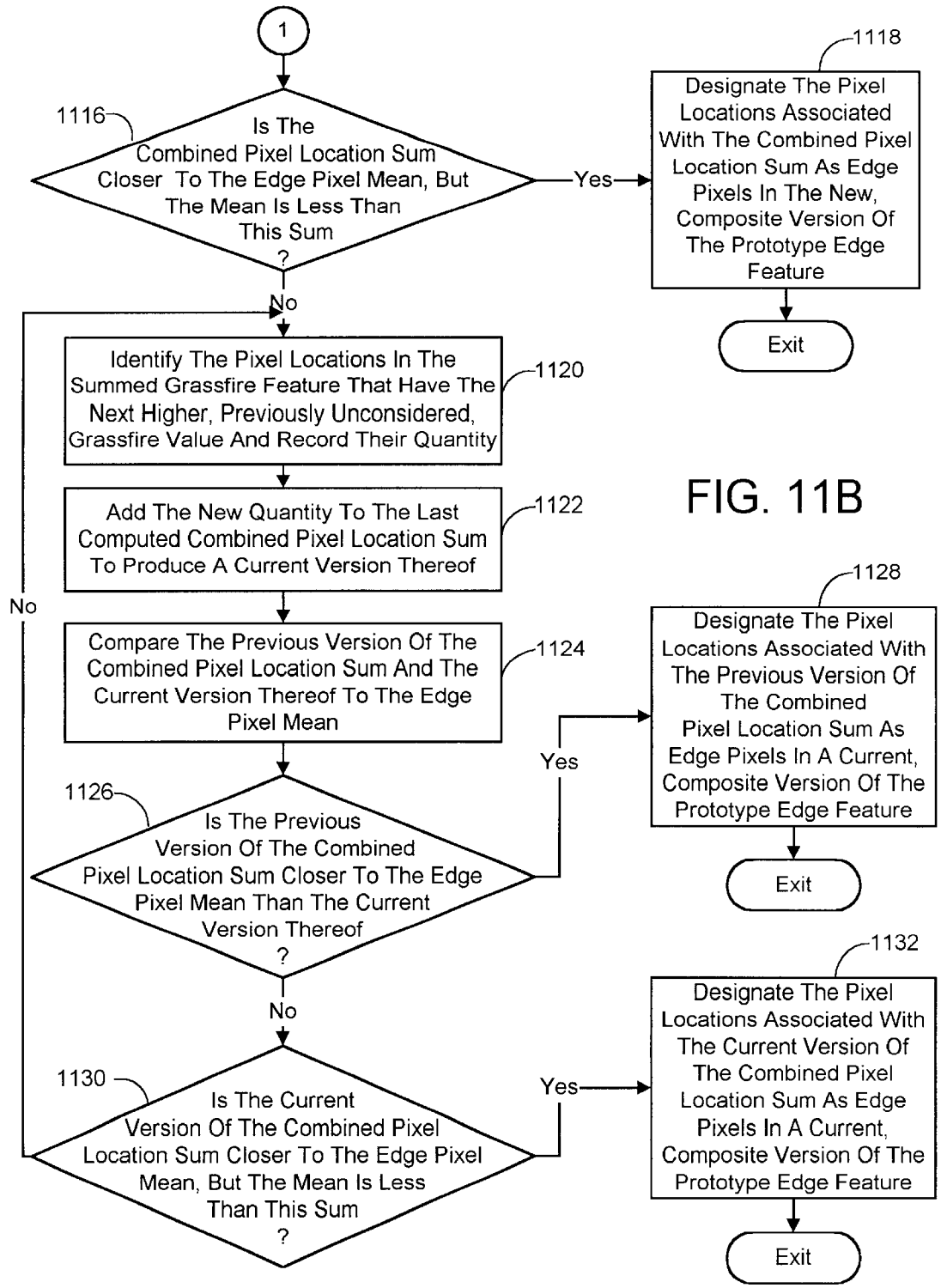

Specifically, as illustrated in the flow chart of FIGS. 11A and 11B, for each prototype feature in turn, the mean number of edge pixels in the raw edge features assigned to the prototype feature is computed (process action 1100). This mean is the sum of the number of edge pixels in the raw edge features assigned to the prototype feature, divided by the number of assigned raw features. The grassfire values associated with each respective pixel location of the assigned raw edge features are then summed to create a summed grassfire feature (process action 1102).

A so-called level sets approach is then used, which begins by identifying the pixel locations in the summed grassfire feature that have the lowest grassfire value and to record how many of these pixel locations there are (process action 1104). The pixel locations of the summed grassfire feature that have the next higher grassfire value are then identified and the quantity is recorded (process action 1106). Next, in process action 1108, the number of pixel locations having the lowest grassfire value is added to the number of locations having the next higher grassfire value to produce a combined pixel location sum. The number of pixel locations having the lowest grassfire value and the combined pixel location sum are compared to the previously computed edge pixel mean $m_F$ (process action 1110). It is then determined if the number of pixel locations having the lowest grassfire value is closer to the edge pixel mean than the combined pixel location sum (process action 1112). If so, the pixel locations having the lowest grassfire value are designated as edge pixels in the new, composite version of the prototype edge feature under consideration (process action 1114). Each of the prototype edge pixels is assigned a first binary value (e.g., "0"), and all the other pixel locations in the new prototype feature are assigned the other binary value (e.g., "1").

If it is determined that the number of pixel locations having the lowest grassfire value is not closer to the edge pixel mean than the combined pixel location sum, then it is next determined in process action 1116 if the combined pixel location sum is closer to the edge pixel mean, but the mean is still less than this sum. If so, then the pixel locations associated with the sum are designated as edge pixels in the new, composite version of the prototype edge feature (process action 1118). Again, each of the prototype edge pixels is assigned the aforementioned first binary value (e.g., "0"), and all the other pixel locations in the new prototype feature are assigned the other binary value (e.g., "1").

If it is determined, however, that the combined pixel location sum is closer to the edge pixel mean, and the mean is greater than the sum, then additional actions are required to produce the new prototype edge feature. Namely, in process action 1120, the pixel locations in the summed grassfire feature that have the next higher, previously unconsidered, grassfire value are identified, and their quantity is recorded. This new quantity is added to the last computed combined pixel location sum to produce a current version thereof (process action 1122). The previous version of the combined pixel location sum and the current version of the combined pixel location sum are then compared to the edge pixel mean (process action 1124). It is next determined if the previous version of the combined pixel location sum is closer to the edge pixel mean than the current version of the combined pixel location sum (process action 1126). If so, then the pixel locations associated with the previous sum are designated as edge pixels in a current, composite version of the prototype edge feature under consideration (process action 1128). Once again, each of the prototype edge pixels is assigned the first binary value (e.g., "0"), and all the other pixel locations in the current prototype feature are assigned the other binary value (e.g., "1"). If, on the other hand, it is determined that the current version of the combined pixel location sum is closer to the edge pixel mean, but the mean is still less than this sum (process action 1130), then the pixel locations associated with the current sum are designated as edge pixels in the current version of the prototype edge feature. (process action 1132), and assigned the aforementioned first binary value (e.g., "0"), while all the other pixel locations in the new prototype feature are assigned the other binary value (e.g., "1"). However, if it is determined that the current combined pixel location sum is closer to the edge pixel mean, and the mean is greater than the sum, the process of actions 1120 through 1132 are repeated, until a new version of the prototype edge feature is established.

Figure 12:
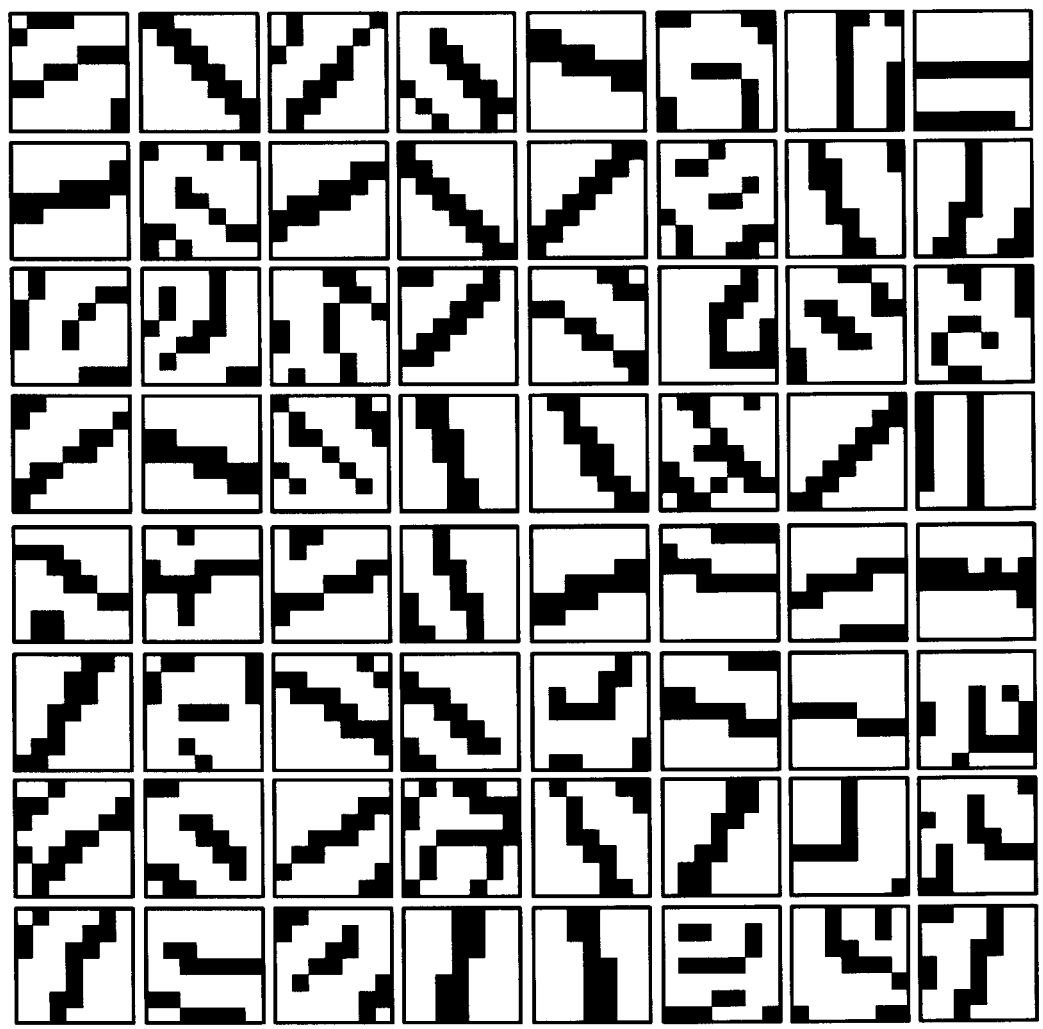
FIG. 12 is a diagram showing a set of 64 prototype edge features.

As indicated previously, once a new version of each of the prototype edge features has been establish the entire procedure of assigning each raw edge feature to the most similar prototype edge feature and revising the prototype edge features can be repeated using the new versions of the prototype features, until the newly generated prototype features do not change from those generated in the previous iteration. At that point, the last generated prototype edge features are declared to be the final prototype features. After running the foregoing process on the exemplary keyboard training images, the result was the $n_p$=64 prototype features shown in FIG. 12.

1.6 Creating Indexed Training Images.

The next part of the training process is to create an indexed version of each synthetic training image. Generally this entails using the prototype features to convert each edge pixel in the training image into an integer $\lfloor 1,2,3, \ldots, n_p \rfloor$ representing the prototype feature that this pixel's surrounding region (e.g., a 7×7 sub-window) is most similar to, as measured using the distance formula of Equation (1). These images the called "indexed" training images because the edge pixels index into the array of prototype features. Not only does this compact representation of the raw edge features reduce memory requirements and computation time in the recognition phase, it also helps the present system and process to ignore small variations among edge features. That is, if a few pixels in a raw feature turn from edge to non-edge or vice versa, that feature will still likely map to the same prototype feature.

Figure 13:
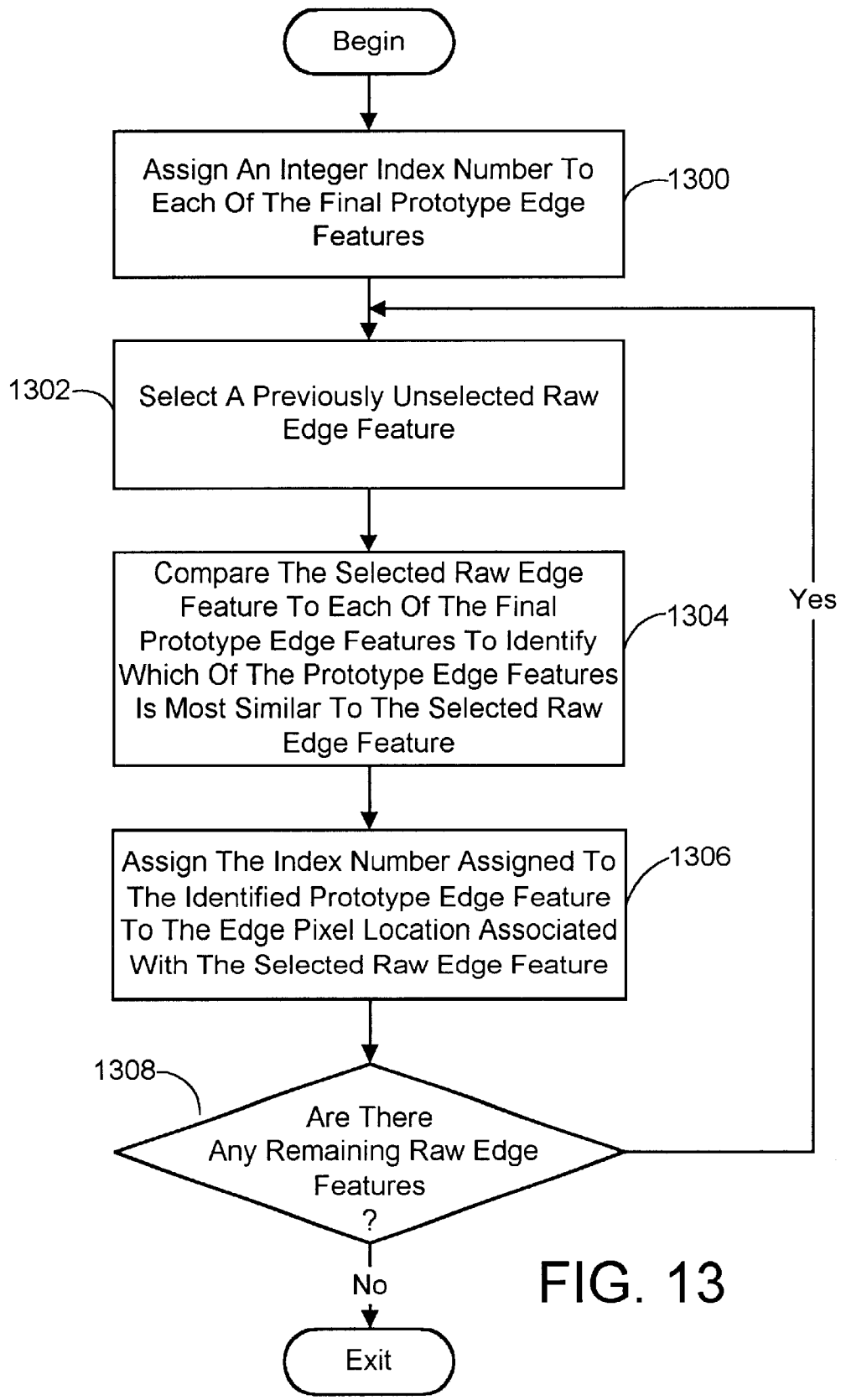
FIG. 13 is a flow chart diagramming a process for creating an indexed training image from each edge pixel training image in connection with the overall process of FIG. 2.

Specifically, referring to FIG. 13, the process of creating indexed training images entails first assigning an integer index number to each of the final prototype edge features (process action 1300). Preferably, these numbers will run from 1 to $n_p$, where $n_p$ is the total number of prototype edge features. One of the raw edge features associated with the edge pixel training images is then selected, as indicated by process action 1302. The selected raw edge feature is compared to each of the final prototype edge features using the previously described grassfire transform-distance procedure to identify which of the prototype features is most similar to the selected raw edge feature (process action 1304). Once the closest prototype edge feature is found, the index number assigned to that prototype feature is assigned to the edge pixel location associated with the selected raw edge feature to create a pixel of the indexed training image containing the selected edge pixel (process action 1306). Process actions 1302 through 1306 are repeated for each of the remaining raw edge features, as indicated in action 1308. This will result in an index number associated with one of the prototype edge features being assigned to every edge pixel location of every edge pixel training image, thereby producing a set of indexed training images that will be used in the object recognition process as will be explained later.

1.7 Generating Hough Kernels for Each Prototype Edge Feature.

A "Hough kernel" is an efficient form of bookkeeping and execution for the generalized Hough transform. In the traditional generalized Hough transform as first described by Ballard [3], individual edge points on an object's silhouette are quantized by their gradient direction. For each gradient direction, an R-table records all the observed offset vectors to a reference point on the object. The R-table is then used to increment an accumulator array based on the gradient direction of each edge point in the input image. This concept has been modified and adapted to the present object recognition system and process to create what will be referred to as a Hough kernel. Generally, each edge point is quantized to an index value j based on that point's surrounding pattern of edges. Each occurrence of an index value j in an indexed input image gives evidence for several different possible reference point locations of the object. The Hough kernel for this index value represents this evidence in an efficient and usable way. The Hough kernels are built based on the indexed training images. Each edge point i in the training images has a prototype index j associated with it. It also has an associated relative pixel offset vector $\overline{c}_i$ that points to the object's reference point in the training image. Thus, each index j has a collection of different offset vectors associated with it. As will be discussed later, when a particular index j is seen in an indexed input image being searched, it gives evidence for a number of different center offsets, and the Hough transform casts a vote for each one using a Hough kernel.

Figure 14:
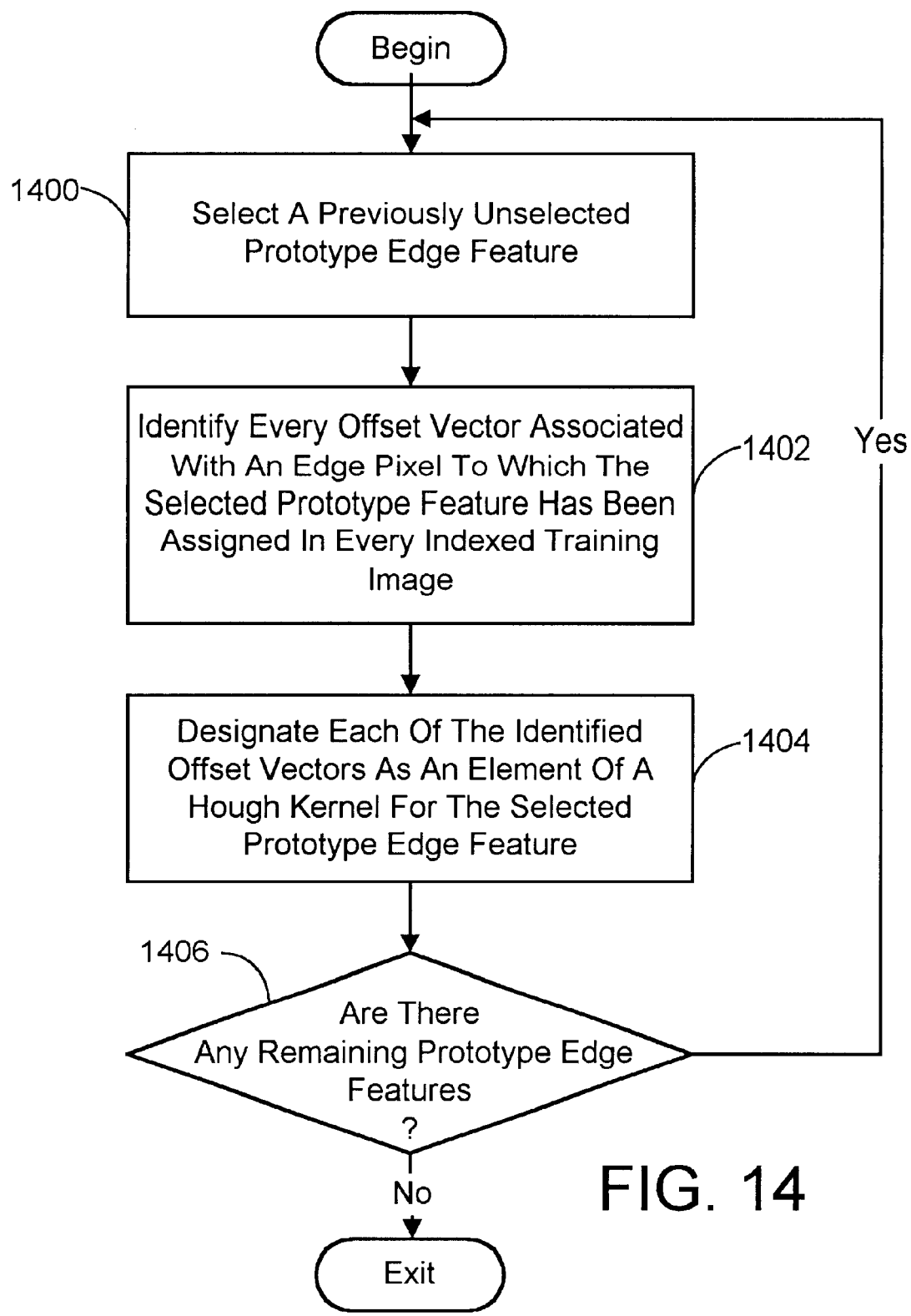
FIG. 14 is a flow chart diagramming a process for defining a Hough kernel for each prototype edge feature in accordance with the overall process of FIG. 2.
Figure 15:
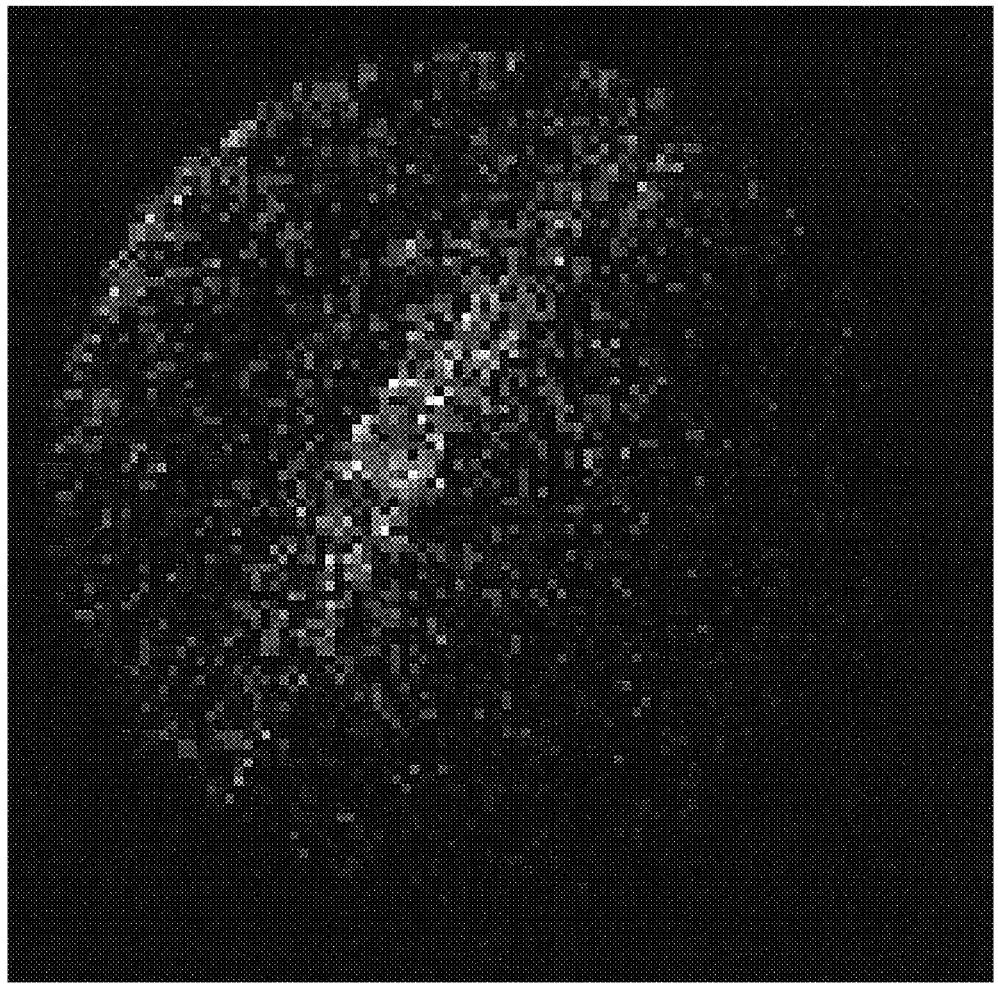
FIG. 15 is an image representation of a Hough kernel.

Specifically, referring to the flow chart of FIG. 14, one of the prototype edge features is selected (process action 1400). Every offset vector associated with an edge pixel to which the selected prototype feature has been assigned (as evidenced by the prototype index number of the feature) is identified in every indexed training image (process action 1402). Each of these identified offset vectors is then designated as an element of a Hough kernel for the selected prototype edge feature (process action 1404). The foregoing process is then repeated for each of the remaining prototype edge features, as indicated in process action 1406, to generated a Hough kernel for each. The Hough kernel itself can be thought of as an "image" having a central pixel location, or origin, from which all the offset vectors associated therewith originate. Each of the vectors defines a pixel location in this image coinciding to its termination point. An example of such an image can be seen in FIG. 15. It is noted that more than one offset vector may terminate at the same pixel location. For purposes of the present invention, the Hough kernel is characterized as an image where the pixel values for each pixel location correspond to a number or vote count indicating how many offset vectors terminated at that pixel location.

2. Recognizing Objects

The object recognition phase begins by obtaining an image it is desired to search for the object the present system has been trained to recognize. This image will be referred to as an input image. As with the initial images containing the object that were employed in the training phase, the input image is either a digital image of the scene or a photographic image which has been digitized and input into the present object recognition system. It is also noted that the procedures described below assume that only one surface of interest of the object is being sought in a input image. If there are more than one surface of interest of the object, then the following procedures would be repeated for each surface.

2.1 Creating an Indexed Input Image.

Figure 16:
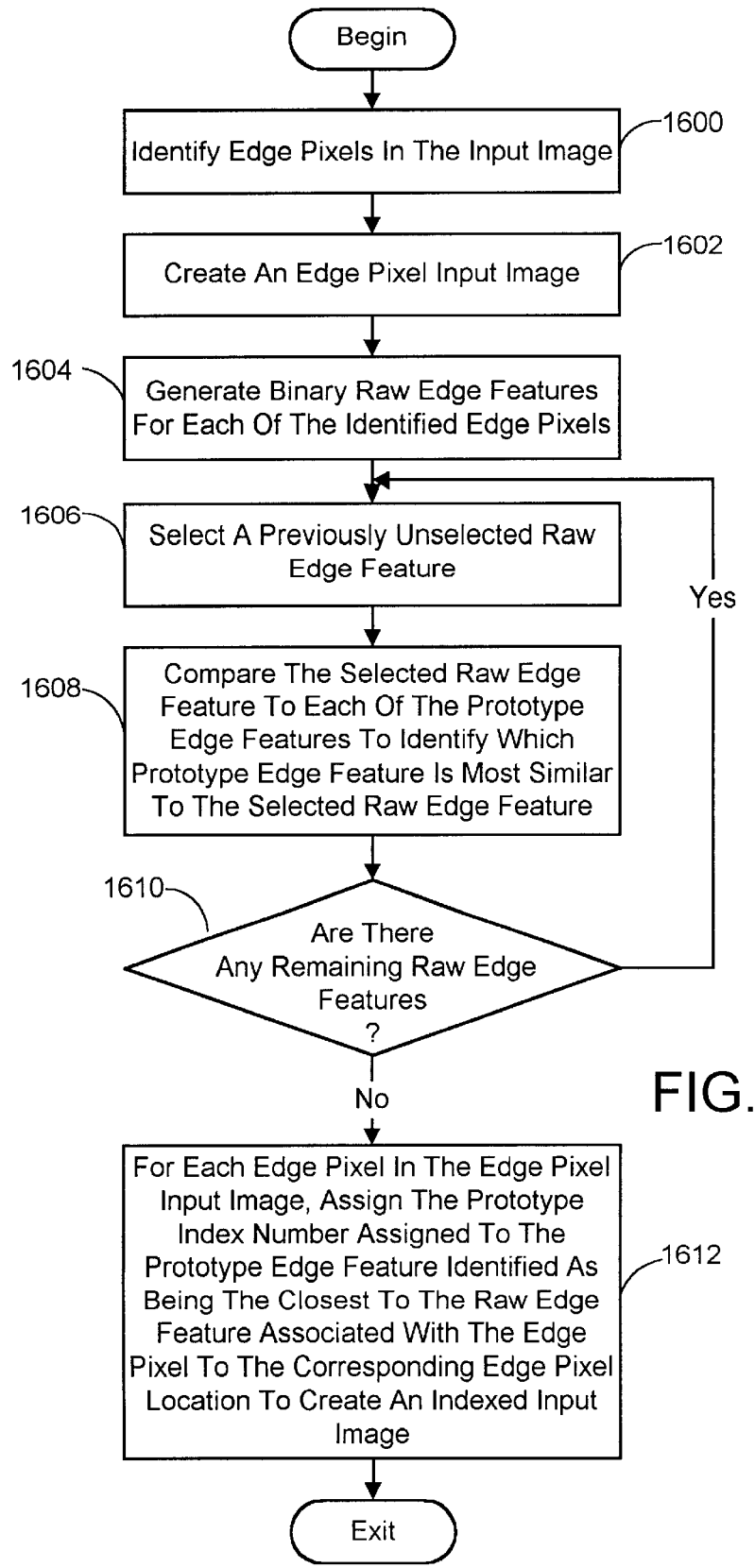
FIG. 16 is a flow chart diagramming a process for creating an indexed input image in connection with the overall process of FIG. 2.

The input image is first processed to generate an indexed version thereof. This essentially entails abstracting the input image in the same way as the initial images using an edge detection technique (which is preferably the Canny edge detection process). An example of a resulting edge pixel input image is shown in FIG. 18C. More particularly, referring to the flow chart of FIG. 16, the edge detection process is used to identify the edge pixels existing in the input image (process action 1600), and an edge pixel input image is created (process action 1602). In this edge pixel input image, each pixel location corresponding to an edge pixel is assigned a first binary value (e.g., "0") and each pixel location corresponding to a non-edge pixel of the input image is assigned the other binary value (e.g., "1"). Binary raw edge features are then generated in process action 1604 for each of the identified edge pixels using the same procedure described in connection with the training images, including using the same size sub-window (e.g., 7×7 pixels). Next, one of the raw edge features is selected, as indicated by process action 1606. The selected raw edge feature is compared to each of the prototype edge features using the previously described grassfire transform-distance procedure to identify which prototype edge feature is most similar to the selected raw edge feature (process action 1608). Process actions 1606 and 1608 are repeated for each remaining raw edge feature, as indicated by process action 1610, to find the prototype edge feature that is closest to each of the raw edge features associated with the input image. Next, for each edge pixel in the edge pixel input image, the previously-described prototype index number assigned to the prototype edge feature identified as being the closest to the raw edge feature associated with the edge pixel under consideration is assigned to the corresponding edge pixel location to create an indexed input image (process action 1612).

2.2 Producing a Voting Image from the Indexed Input Image.

Once a prototype index number has been assigned to each corresponding edge pixel location the indexed input image is ready to be used in the next part of the object recognition process. Namely, producing a voting image from the indexed input image. A voting image in the context of the present object recognition system and process is an image whose pixels indicate the number of the aforementioned offset vectors that terminated at the pixel.

Generally, the voting image is encoded for a particular index j with a Hough kernel, $H_j(x,y)$. These kernels are used to build up a vote image, initially all zeros, for the object's aforementioned reference point in the input image. When index j is encountered at a particular location in an indexed input image, a copy of $H_j(x,y)$ is laid down on the vote image, with the origin (i.e., the aforementioned central pixel) of $H_j(x,y)$ centered at that index's location in the vote image. Then, this translated $H_j(x,y)$ is summed into the vote image. In equations, $H_j(x,y)$ is given by $$H_j(x, y) = \sum_{\substack{i: f_i(x,y) \text{ is} \\ \text{prototype is} \\ p_j(x,y)}} \delta(\vec{x} - \vec{c}_i) \tag{3}$$

where $$\delta(\vec{x}) = \begin{cases} 1 & \text{if } \vec{x} = (0, 0) \\ 0 & \text{otherwise} \end{cases}$$

and $i \in \lfloor 1,2,3, \ldots n_f \rfloor$, with $n_f$ equal to the number of edge points in all the training images for that object.

The vote image is built up from correlations between each Hough kernel and equal-value slices of the indexed test image. If the indexed test image is $I(x,y)$, its equal-value slices are $$I_j(x, y) = \begin{cases} 1 & \text{if } I(x, y) = j \\ 0 & \text{otherwise} \end{cases} \tag{4}$$

and $$I(x, y) = \sum_{j=1}^{n_p} j I_j(x, y) \tag{5}$$

Each "1" in an $I_j(x,y)$ indicates the presence of index j at that point. If a copy of $H_j(x,y)$ is laid down at that point, it will show how that point votes for the location of the prescribed reference point of the object.

Mathematically, the vote image $V(x,y)$ is $$V(x, y) = \sum_{j=1}^{n_p} [H_j(x, y) \otimes I_j(x, y)] \tag{6}$$

where "$\otimes$" indicates correlation. It is noted that since correlation and convolution are closely related, it would possible as an alternate embodiment to implement Equation (9) with an FFT for speed.

Figure 17:
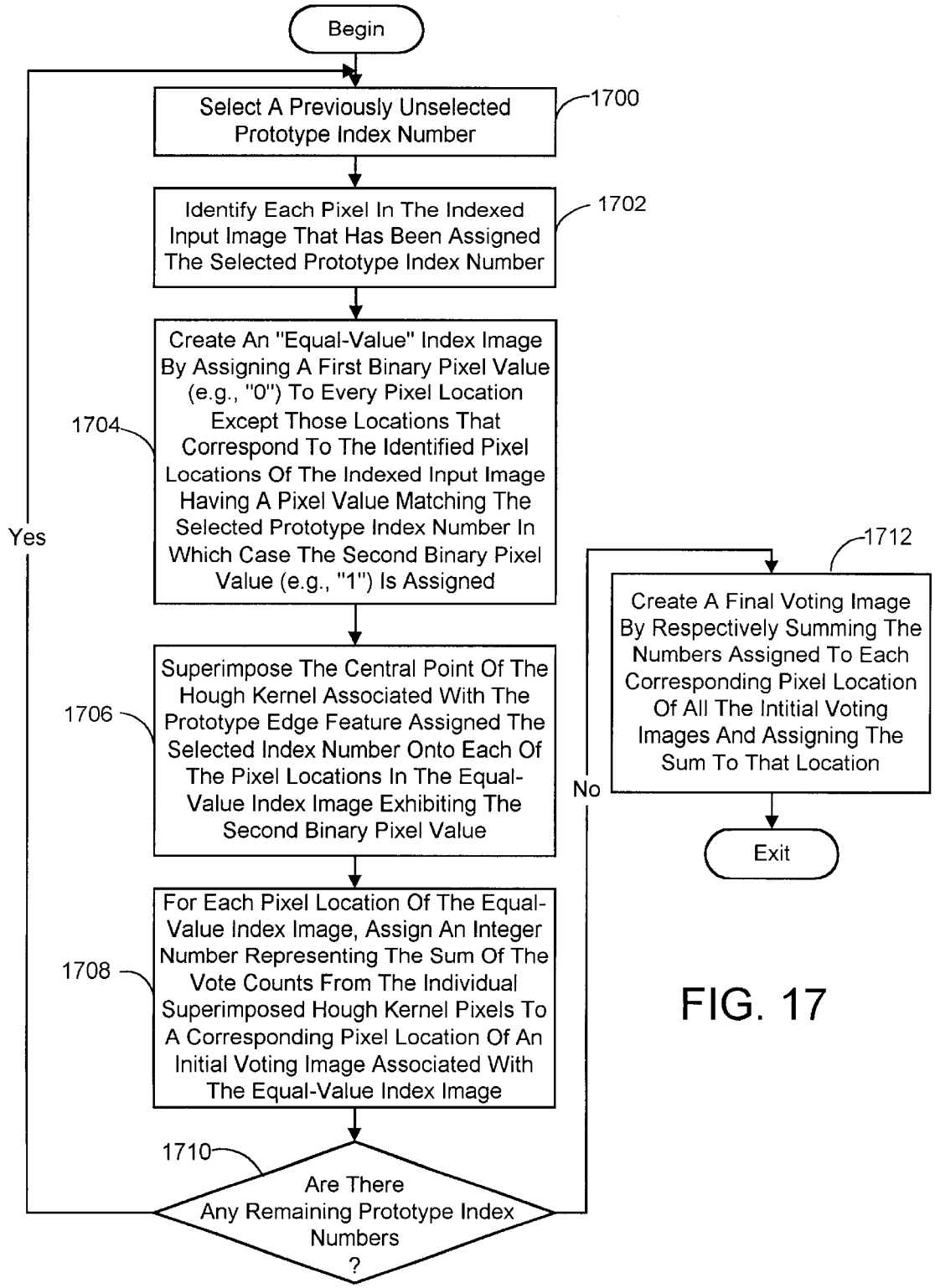
FIG. 17 is a flow chart diagramming a process for generating a voting image from the index input image in connection with the overall process of FIG. 2.

A flow chart diagramming the foregoing procedure for generating a voting image is provided in FIG. 17. As can be seen, the first action involves, selecting one of the prototype index numbers associated with the prototype edge features (process action 1700). Next, each pixel in the indexed input image that has been assigned the selected prototype index number is identified (process action 1702). Once this has been done, an "equal-value" index image is created by assigning a first binary pixel value (e.g., "0") to every pixel location with the exception of those pixel locations that correspond to the identified pixel locations of the indexed input image having a pixel value matching the selected prototype index number, in which case the second binary pixel value (e.g., "1") is assigned to these pixel locations (process action 1704). It is noted that an equal-value index image is the same size as the indexed input image. Thus, each equal value index image only identifies the location of edge pixels associated with one particular prototype edge feature. Noting that a Hough kernel is characterized as an image having a central pixel location and pixel values (i.e., vote counts) indicative of the number of offset vectors terminating at each pixel location in the image, the next action 1706 is to superimpose the central point of the Hough kernel associated with the prototype edge feature assigned the selected index number onto each of the pixel locations in the equal-value index image exhibiting the second binary pixel value (e.g., "1"). For each pixel location of the equal-value index image under consideration, an integer number representing the sum of the vote counts from the individual superimposed Hough kernel pixels is assigned to a corresponding pixel location of an initial voting image associated with the equal-value index image (process action 1708). Process actions 1700 through 1708 are then repeated for each of the remaining prototype index numbers, as indicated in process action 1710, to produce a similar initial voting image for each prototype edge feature. Once complete, the individual initial voting images are combined to form a final voting image by respectively summing the numbers assigned to each corresponding pixel location of all the initial voting images and assigning the sum to that location in the final voting image (process action 1712). An example voting image is shown in FIG. 18D.

2.3 Eliminating Pixels from the Voting Image that Cannot Correspond to the Object.

In order to reduce the processing required for the foregoing procedures associated with creating the indexed input image and its associated final voting image, an optional procedure can be performed to eliminate pixels from the input image that cannot possibly be part of the object. Eliminating these pixels can make the object recognition more accurate by preventing pixel locations that may have large vote numbers due to noise or the coincidence of corresponding to an extraneous object in the input image that has a similar structure to the object being sought. Essentially, the elimination process uses pixel color to decide if a pixel location can be associated with the object being sought or not.

Essentially, a 256×256×256 Boolean lookup table (LUT) is constructed that determines whether or not any (R,G,B) in the input image can likely be part of the object. R, G, and B are all $\epsilon[0,1,2, \ldots ,255]$, and there is one entry in the LUT for each possible (R,G,B). The LUT is built by examining all the pixels on the object's actual (non-synthetic) base training image. Each (R,G,B) pixel in this image is projected to the unit sphere by dividing by $\sqrt{R^2+G^2+B^2}$. This normalization helps eliminate the effects of illumination intensity and shadows. A small acceptance region around each projected color pixel is established, and each (R,G,B) in the LUT is also projected to the unit sphere. If it is not within the acceptance region of any projected pixels of the base training image, that LUT location is marked as a color that should be eliminated from consideration as part of the object. For objects whose colors are quite different from the background, this technique increases the speed and efficiency of the algorithm significantly.

Figure 19A:
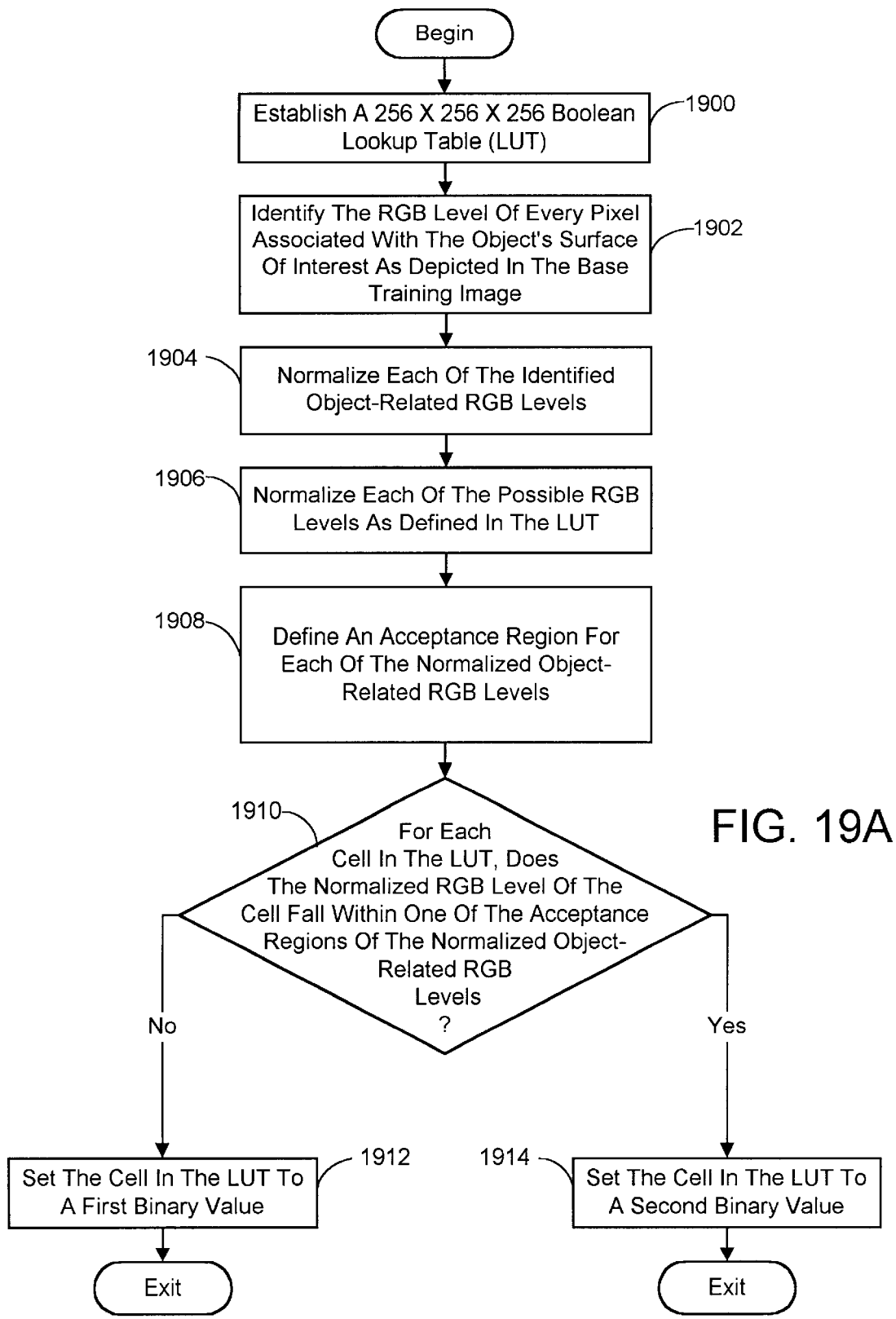
FIG. 19A is a flow chart diagramming a process for generating a binary look-up table identifying which image pixel colors are object-related, in accordance with the present invention.

A flow chart diagramming the foregoing procedure for constructing the desired LUT is provided in FIG. 19A. As can be seen, the first process action 1900 involves establishing the 256×256×256 Boolean lookup table (LUT). Each cell of this table represents a unique RGB combination and the table as a whole covers all possible RGB levels (i.e., RG&B values each range from 0 to 255). Next, the RGB level of every pixel associated with the surface of interest of the object as depicted the previously-described base training image is identified (process action 1902). Each unique object-related RGB level is normalized to eliminate the effects of illumination intensity variations and shadows (process action 1904). Each of the possible RGB levels as defined in the LUT are also normalized as described above (process action 1906). An acceptance region of a predetermined size is then defined around each of these normalized object-related RGB levels (process action 1908). It is next determined, for each cell in the table, whether the normalized RGB level of the cell falls within one of the acceptance regions of the normalized object-related RGB levels (process action 1910). If not, in process action 1912, the cells in the LUT are set to a first binary value (e.g., "1"). Conversely, all the cells of the table associated with normalized RGB levels that do fall within one of the established acceptance regions would be set to the other binary value (e.g., "0") in the LUT to indicate it is a color consistent with the object being sought (process action 1914). Thus, the net result is a binary LUT that identifies which colors (i.e., RGB combinations) are consistent with the object being sought.

Figure 19B:
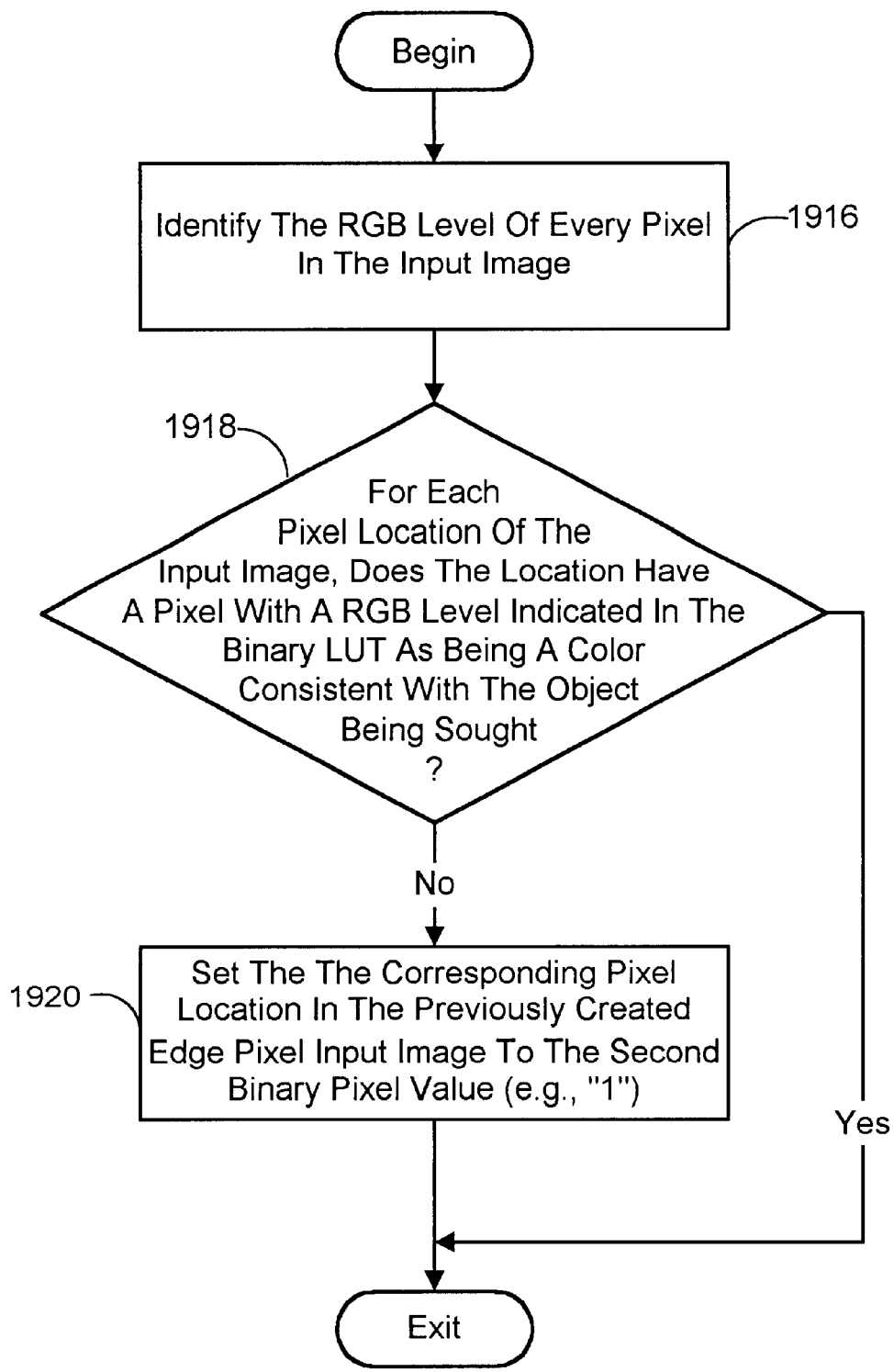
FIG. 19B is a flow chart diagramming a process for eliminating from consideration as pixels depicting the surface of interest of the object being sought, any pixel not exhibiting an object-related color, in accordance with the present invention.

Once the binary LUT has been created, the next part of the elimination process is to identify the RGB level of every pixel in the input image, as indicated in process action 1916 of FIG. 19B. Then, in process action 1918, for each pixel location of the input image, it is determined if the location has a pixel with a RGB level indicated in the binary LUT as being a color consistent with the object being sought (e.g., has a value of "1" in the LUT). If it is determined that the RGB level of the pixel in the input image is not an object-related color, then the corresponding pixel location in the previously created edge pixel input image is eliminated from consideration by setting its value to the second binary pixel value (e.g., "1"), thereby indicating no edge at that point (process action 1920). Otherwise, no action is taken. In this way, those pixels of the input image that cannot be part of the object's surface, but which would have been identified as an edge in the edge pixel input image, are eliminated from consideration when producing the indexed input image and its associated voting image. This can reduce the processing requirements considerably as these extraneous edge pixels need not be considered.

While the size of the aforementioned acceptance region could be set to a default setting (e.g., 5 RGB units in all directions), it is preferable that this parameter be user-specified so that the elimination process can be fine tuned to the particular scene been analyzed. One way to achieve this goal would be through an interactive process with the user. For example, the foregoing procedure of establishing a binary LUT could be performed in the training phase of the object recognition, as it employs the extracted region of the initial model image (i.e., the base training image) which is produced With the user's help at that time. Once the binary LUT has been established using a default setting (or an initial user-specified setting) for the acceptance region size, the results could be displayed to the user. This can be accomplished by, for example, assigning the appropriate binary value listed in the binary LUT to each pixel of the model image of the scene that was used to generate the training images. The binary-converted initial image would then be displayed to the user. The image would show all the pixels having a non-object related color in one color (e.g., black), and all the object-related colors in another color (e.g., white). An example image and the resulting "binary converted" image that has been passed through a LUT are respectively shown in FIGS. 18A and 18B. In FIG. 18B the pixels with colors that have been determined to be consistent with the keyboard are shown in white, will those that are deemed to have colors that are not consistent are shown in black. Here, the beige keyboard is being sought, whose normalized colors happen to match well with much of the background, including the gray desk.

If the user determines that the binary-converted image does not show a sufficient number of the pixels associated with the object's surface of interest in the same color, he or she could adjust the acceptance region size. A new binary LUT would be created, and then a new binary-converted image displayed to the user. This interactive process would continue until the user determines that the selected acceptance region size results in a sufficient number of the pixels associated with the object's surface of interest being displayed in the same color. At that point the selected acceptance region size is designated as the final size and later used in the previously-described elimination process. It is noted that the display of a sufficient number of the pixels associated with the object's surface of interest would preferably equate to the situation where a substantial number of the pixels associated with the object's surface of interest are displayed in the same color, while at the same time as many of the pixels of the binary-converted image that do not depict the surface of interest of the object as possible are shown in the other color. This would ultimately mean that a maximum number of the non-object related pixels in the voting image would be eliminated from consideration.

The foregoing interactive process makes the selection of the acceptance region parameter as simple as possible for the user. It is noted that this is one of only two parameters that a user is required to set. As discussed previously, a user should not be expected to set numerous parameters. The present object recognition system and process requires the setting of only the foregoing parameter, and a detection threshold that will be discussed next. Thus, the present system and process achieve the goal of minimal user input.

2.4 Determining if the Object Being Sought is Depicted in the Input Image.

Figure 20:
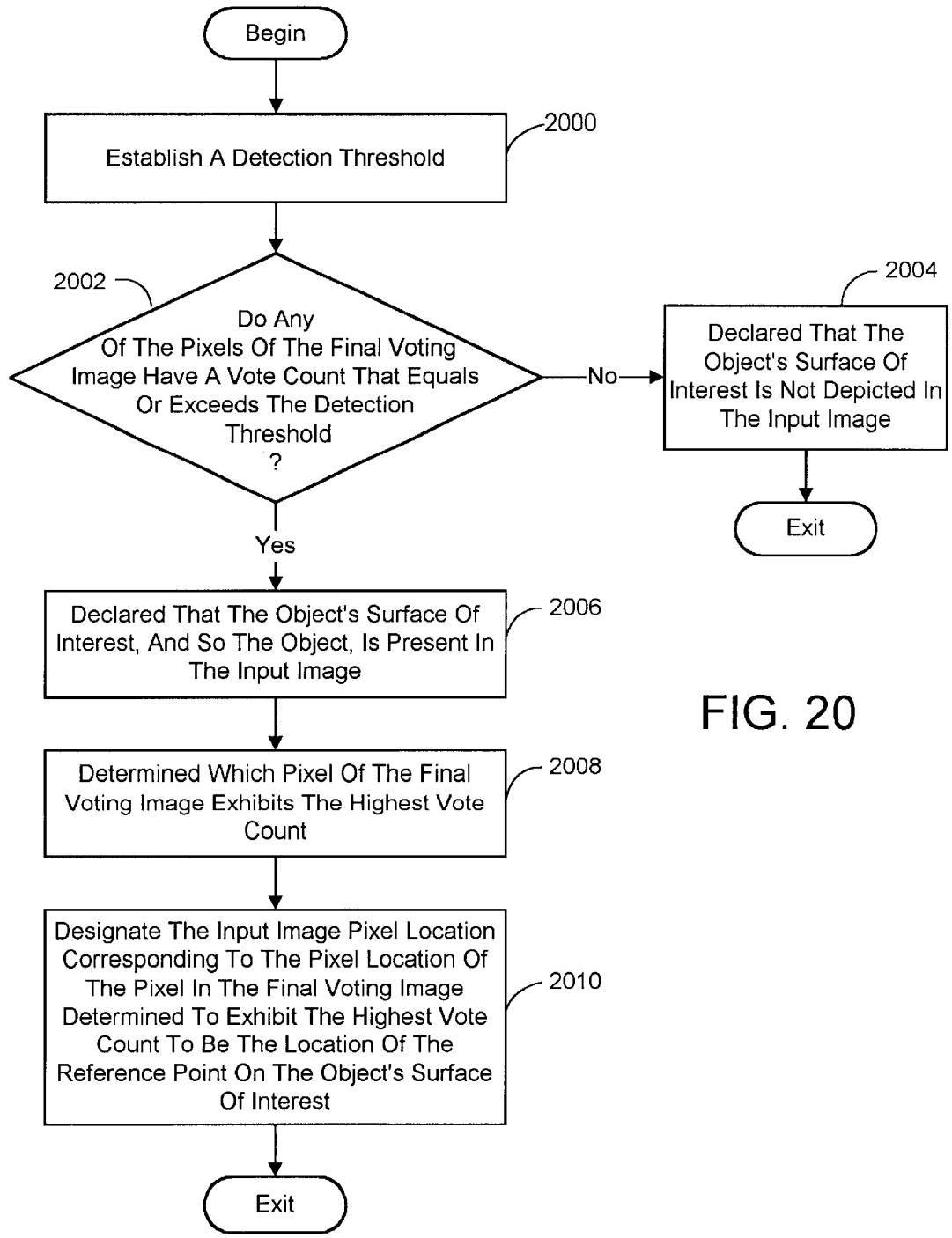
FIG. 20 is a flow chart diagramming a process for declaring an object to be present in an input image and designating the pixel location corresponding to a prescribed reference point on the surface of interest of the object being sought, in accordance with the overall process of FIG. 2.

It is expected that the pixel in the final voting image associated with an input image containing the object being sought will have the largest vote number at a location coinciding with the previously mentioned prescribed reference point of the surface of the object. Thus, it is possible to determine if the object being sought is depicted in the input image, and if so where. Referring to the flow chart of FIG. 20, this is accomplished by first establishing a detection threshold defining the minimum vote count necessary to indicate that a pixel location in the final voting image could correspond to the pixel location of the prescribed reference point in the input image (process action 2000). It is then determined in process action 2002 whether any of the pixels of the final voting image have a vote count that equals or exceeds the detection threshold. If none of the pixels in the final voting image have a vote count that equals or exceeds the detection threshold, then it is declared that the object's surface of interest is not depicted in the input image (process action 2004). If, however, one or more of the pixels in the final voting image does equal or exceed the detection threshold, then it is declared that the object's surface of interest, and so the object, is present in the input image (process action 2006). Further, it can be determined which pixel of the final voting image, among the pixels equaling or exceeding the final detection threshold, exhibits the highest vote count (process action 2008). The pixel location of input image corresponding to the pixel location of the pixel in the final voting image determined to exhibit the highest vote count equaling or exceeding the final detection threshold is then designated to be the location of the aforementioned reference point on the object's surface of interest as it appears in the input image (process action 2010).

While the size of the aforementioned detection threshold could be set to a default setting (e.g., 50% of the number of expected edge pixels on the object of interest), it is preferable that this parameter be user-specified so that the object recognition process can be fine tuned to the particular object being sought. One way to accomplish this task would be through an interactive process with the user. For example, at the end of the training phase, it would be possible to run the foregoing object recognition process on the model image that was used to produce the training images. Alternately, a new image of the scene containing the surface of interest of the object at a known location, could be employed. Essentially, the detection threshold would be established by first performing the previously described object recognition process on the aforementioned model image, or a new image containing the object's surface of interest, using either a default detection threshold value or one specified by the user as the initial threshold. The pixels of the final voting image produced during the object recognition process that equal or exceed the initial detection threshold would be highlighted in a manner apparent to the user in the model or new image displayed to the user. The user would then determine if a significant number of pixels not depicting the object's surface of interest are highlighted in the displayed image. If so, then the user would provide a revised detection threshold that is higher than the last-employed threshold, and the object recognition process would be repeated using the model or new image and the revised threshold. If, on the other hand, the user discovers that very few or no pixels are highlighted in the part of the image known to contain the object's surface of interest, then the user would provide a revised detection threshold that is lower than the last-employed threshold, and the process would be rerun as before. This interactive procedure would continue until the user decides that a sufficient number of pixels are highlighted in the area containing the object's surface of interest, while as few of the pixels not depicting the surface as possible are highlighted. At that point, the last-employed threshold would be designated as the final detection threshold and used in recognizing objects in future input images of the scene.

3.0 Testing and Analysis.

We have tested our object recognition system and process on a few different objects, however as our original goal was to find keyboards in images for an intelligent room, we concentrate on that object in this section. As a potential consumer application, the program is simple to run from a user's perspective. For example, the user is asked to present the keyboard to the camera, oriented roughly perpendicular to the camera's line of sight. He or she snaps an image and outlines the keyboard in this image using the mouse. The program has five parameters that must be set: the size of the smoothing window for the Canny edge detector, the low and high edge strength thresholds for the Canny edge detector, the color match tolerance for the color pruning step, and the detection threshold applied to the vote image. The process is somewhat insensitive to the Canny parameters, so the user would not be expected to change their default settings. As explained above, the color match and detection thresholds are preferably set interactively. Overall the training procedure is quite easy from a user's perspective.

With the hand-segmented image of the keyboard, the training program renders 558 synthetic training images of the object at different angles of roll, pitch, and yaw (scaling was not performed). These training images are converted to edge pixel images, and then 7×7 edge sub-windows are extracted around each edge point in the training images. Using many small edge templates means the process can tolerate partial occlusion, because we can set the detection threshold low enough that it does not require all the features to contribute a vote. Also, using edges instead of, say, gray scale or color templates, means that the algorithm is somewhat robust to changes in illumination, because edges are somewhat robust to the same. These raw features are clustered with a k-means algorithm to produce 64 prototype features. Finally a Hough kernel is created for each prototype feature. The whole training process takes about five minutes on a 500 MHz PC, with the user's involvement limited to the very beginning (outlining the object) and very end (setting the color pruning threshold and detection threshold).

Figure 21:
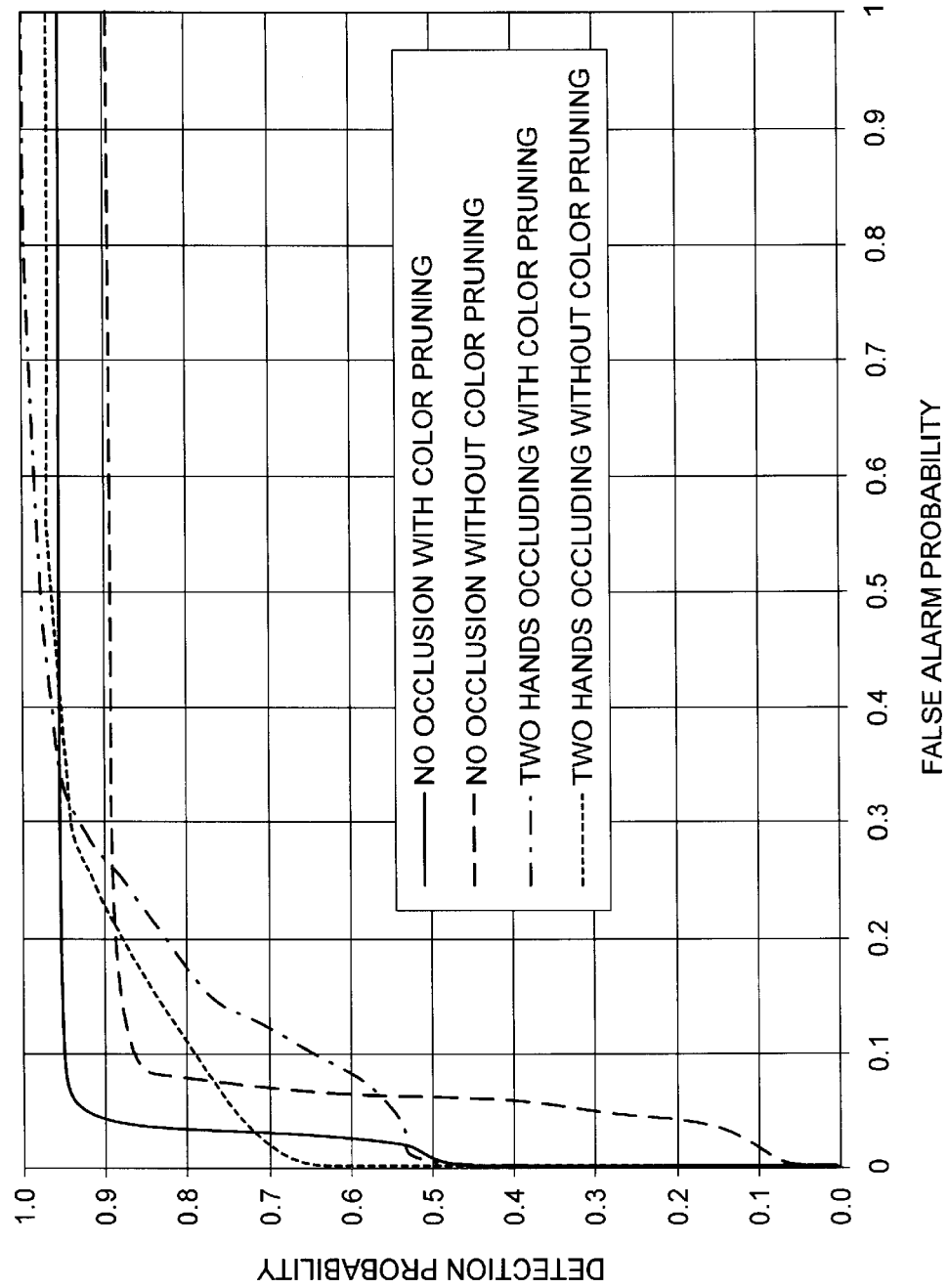
FIG. 21 is a graph of ROC curves showing the performance of a tested embodiment of the object recognition system and process according to the present invention.

Running the recognition program is also pleasant from a user's point of view. For a single object on a 320×240 image, it runs at about 0.7 Hz on the same 500 MHz PC. The ROC curves in FIG. 21 show how the performance varies with the choice of the detection threshold on the vote image. When the keyboard is not occluded the detection rate is about 0.935 with a false alarm rate of 0.065 on a test of 200 images with the keyboard and 200 images without the keyboard. The test images with the keyboard showed the keyboard in various orientations on and above the desk. The ROC plot shows that the performance drops when the color pruning is turned off, with the best operating point giving a detection rate of 0.865 and a false alarm rate of 0.095. The ROC curves also show how much the performance drops when the keyboard is occluded by two hands typing, a typical image of which is shown in FIG. 18A. If we insist that the false alarm rate stay below 0.1, then the best operating point with the color pruning turned on gives a detection rate of 0.65 and false alarm rate of 0.085.

Curiously, performance improves slightly with the color pruning turned off, with a detection rate of 0.74 and false alarm rate of 0.035. We suspect that with the LUT turned off, the occluding hands are producing horizontal and vertical edges that look like certain parts of the keyboard, and are therefore contributing to the correct peak.

The fact that the program performs as a pure recognizer with no tracking has advantages and disadvantages. The main advantage is that the keyboard can quickly appear and disappear in the frame anytime and anywhere, and it can move arbitrarily fast, because the program uses no assumptions about where the object should be. However, a crude form of tracking—averaging detection results over the past few frames—would help smooth over many of the detection errors at the expense of some delay in the reports, and so could be implemented if desired.

References

[1] K. Bowyer, C. Kranenburg, S Dougherty, "Edge Detector Evaluation Using Empirical ROC Curves," CVPR99, 1999, pp. 354–359.

[2] D. P. Huttenlocher, G. A. Klanderman, and W. J. Rucklidge, "Comparing Image Using the Hausdorff Distance," *IEEE Transactions on Pattern Analysis and Machine Intelligence*, vol. 15, no. 9, pp. 850–863, 1993.

[3] D. H. Ballard, "Generalizing the Hough Transform to Detect Arbitrary Shapes," *Pattern Recognition*, vol. 13, no. 2, pp. 111–122, 1981.

Wherefore, what is claimed is:

1. A computer-implemented process for recognizing objects in an input image of a scene, comprising using a computer to perform the following process actions:

generating training images depicting a surface of interest of an object it is desired to recognized in said input image of the scene; creating a set of prototype edge features which collectively represent the edge pixel patterns encountered within a sub-window centered on each pixel depicting an edge of the object in the training images;

defining a Hough kernel for each prototype edge feature, wherein a Hough kernel for a particular prototype edge feature is defined by a set of offset vectors representing the distance and direction, from each edge pixel having a sub-window associated therewith that has an edge pixel pattern best represented by the prototype edge feature, to a prescribed reference point on the surface of interest of the object, wherein said offset vectors are represented in the Hough kernel as originating at a central point thereof;

identifying for each pixel in the input image depicting an edge, which prototype edge feature best represents the edge pixel pattern exhibited within said sub-window centered on the input image edge pixel under consideration;

for each pixel location in the input image, identifying how many offset vectors terminate at that location from Hough kernels centered on each edge pixel location of the input image, wherein the Hough kernel centered on each pixel location is the Hough kernel associated with the prototype edge feature best representing the edge pixel pattern exhibited within said sub-window centered on that input image edge pixel location; and declaring the object to be present in the input image if any of the pixel locations in the input image have a quantity of offset vectors terminating thereat that exceed a detection threshold which is indicative of the presence of the surface of interest of the object.

2. The process of claim 1, wherein the process action of creating a set of prototype edge features, comprises the actions of:

for each training image, detecting edge pixels and producing an edge pixel training image representing the training image;

defining a raw edge feature associated with each edge pixel in each edge pixel training image, said raw edge feature comprising a sub-window in the edge pixel training image of a prescribed size which is centered on an edge pixel;

creating a prescribed number of prototype edge features each of which represents a group of the raw edge features, wherein each raw edge feature in a group of raw edge features represented by a prototype edge feature is more similar to that prototype edge feature than any of the other prototype edge features.

3. The process of claim 2, wherein the process action of producing an edge pixel training image representing each training image, comprises the process actions of:

assigning a first binary value to each pixel location of each training image corresponding to an edge pixel; and assigning a second binary value to each pixel location of each training image corresponding to a non-edge pixel.

4. The process of claim 2, wherein the prescribed size of the sub-window is 7 by 7 pixels, and the prescribed number of prototype edge features is 64.

5. The process of claim 2, wherein the process action of creating a prescribed number of prototype edge features, comprises the actions of:

creating a number of arbitrary, initial prototype edge features equal to said prescribed number of prototype edge features, wherein each initial prototype edge feature is created by randomly assigning each pixel location thereof as either corresponding to an edge pixel or a non-edge pixel;

computing the similarity between a prescribed number of raw edge features and each initial prototype edge feature;

assigning each of said prescribed number of raw edge features to the initial prototype edge feature to which it is most similar based on the computed similarities associated therewith; and replacing each initial prototype edge feature with a composite prototype edge feature produced by combining the raw edge features assigned to the initial prototype edge feature.

6. The process of claim 5, wherein the process action of computing the similarity between the prescribed number of raw edge features and each initial prototype edge feature, comprises the actions of:

computing a grassfire transform from each of the prescribed number of raw edge features and from each of the initial prototype edge features, such that each edge pixel in the edge features is assigned a grassfire value of "0" and each non-edge pixel is assigned a grassfire value which is an integer number that increases the farther away the non-edge pixel is from the nearest edge pixel;

computing the similarity between each grassfire-transformed raw edge feature and each grassfire-transformed initial prototype edge feature by, for each raw edge feature-initial prototype edge feature pair considered, identifying all the pixel locations in the raw edge feature that correspond to edge pixel locations in the initial prototype edge feature, summing the grassfire values assigned to the identified pixel locations in the raw edge feature to create a raw edge feature grassfire sum, identifying all the pixel locations in the initial prototype edge feature that correspond to edge pixel locations in the raw edge feature, summing the grassfire values assigned to the identified pixel locations in the initial prototype edge feature to create an initial prototype edge feature grassfire sum, and adding the raw edge feature grassfire sum to the initial prototype edge feature grassfire sum to create a combined grassfire sum, wherein the smaller the combined grassfire sum, the more similar the raw edge feature is to the initial prototype edge feature.

7. The process of claim 6, wherein the process action of replacing each initial prototype edge feature with a composite prototype edge feature, comprises the actions of:

(a) computing an edge pixel mean by dividing the sum of the number of edge pixels in each of the raw edge features by the total number of raw edge features assigned to the initial prototype feature;

(b) respectively summing the grassfire values in each corresponding pixel location of the raw edge features assigned to the initial prototype edge feature to create a summed grassfire-transformed edge feature;

(c) identifying locations in the summed grassfire-transformed edge feature having the lowest grassfire value and recording the quantity of these locations;

(d) identifying locations in the summed grassfire-transformed edge feature having the next higher grassfire value and recording the quantity of these locations;

(e) adding the number of pixel locations having the lowest grass fire value to the number of pixel locations having the next higher grassfire value to produce a combined pixel location sum;

(f) comparing the number of pixel locations having the lowest grassfire value, and the combined pixel location sum, to the edge pixel mean;

(g) whenever the number of pixel locations having the lowest grassfire value is closer to the edge pixel mean than the combined pixel location sum, designate the pixel locations having the lowest grassfire value as edge pixels in the composite prototype edge feature;

(h) whenever the combined pixel location sum is closer to the edge pixel mean than the number of pixel locations having the lowest grassfire value, and the mean is less than the combined pixel location sum, designate the pixel locations associated with the combined pixel location sum as edge pixels in the composite prototype edge feature;

(i) whenever the combined pixel location sum is closer to the edge pixel mean than the number of pixel locations having the lowest grassfire value, and the mean is greater than the combined pixel location sum, identifying locations in the summed grassfire-transformed edge feature having the next higher, previously unconsidered grassfire value, and recording the quantity of these locations;

(j) adding the number of pixel locations associated with said next higher, previously unconsidered grassfire value to the last previously computed combined pixel location sum to produce a current combined pixel location sum;

(k) comparing the number of pixel locations associated with the last previously-computed combined pixel location sum, and the current combined pixel location sum, to the edge pixel mean;

(l) whenever the last previously-computed combined pixel location sum is closer to the edge pixel mean than the current combined pixel location sum, designate the pixel locations associated with the last previously-computed combined pixel location sum as edge pixels in the composite prototype edge feature;

(m) whenever the current combined pixel location sum is closer to the edge pixel mean than the last previously-computed combined pixel location sum, and the mean is less than the current combined pixel location sum, designate the pixel locations associated with the current combined pixel location sum as edge pixels in the composite prototype edge feature;

(n) whenever the current combined pixel location sum is closer to the edge pixel mean than the last previously-computed combined pixel location sum, and the mean is greater than the current combined pixel location sum, identifying locations in the summed grassfire-transformed edge feature having the next higher, previously unconsidered grassfire value, recording the quantity of these locations, and repeat process actions (j) through (m).

8. The process of claim 5, further comprising the process actions of:

(a) computing the similarity between the prescribed number of raw edge features and each composite prototype edge feature;

(b) assigning each of said prescribed number of raw edge features to the composite prototype edge feature to which it is most similar based on the computed similarities associated therewith;

(c) replacing the last-produced composite prototype edge feature with a current composite prototype edge feature produced by combining the raw edge features assigned to the last-produced composite prototype edge feature;

(d) repeating process actions (a) through (c), until the edge pixel locations in the current composite prototype edge feature have not changed in comparison to the last-produced composite prototype edge feature; and (e) designating the current composite prototype edge features as the final prototype edge features.

9. The process of claim 8, wherein the process action of computing the similarity between the prescribed number of raw edge features and each composite prototype edge feature, comprises the actions of:

computing a grassfire transform from each of the prescribed number of raw edge features and from each of the composite prototype edge features, such that each edge pixel in the edge features is assigned a grassfire value of "0" and each non-edge pixel is assigned a grassfire value which is an integer number that increases the farther away the non-edge pixel is from the nearest edge pixel;

computing the similarity between each grassfire-transformed raw edge feature and each grassfire-transformed composite prototype edge feature by, for each raw edge feature-composite prototype edge feature pair considered, identifying all the pixel locations in the raw edge feature that correspond to edge pixel locations in the composite prototype edge feature, summing the grassfire values assigned to the identified pixel locations in the raw edge feature to create a raw edge feature grassfire sum, identifying all the pixel locations in the composite prototype edge feature that correspond to edge pixel locations in the raw edge feature, summing the grassfire values assigned to the identified pixel locations in the composite prototype edge feature to create a composite prototype edge feature grassfire sum, and adding the raw edge feature grassfire sum to the composite prototype edge feature grassfire sum to create a combined grassfire sum, wherein the smaller the combined grassfire sum, the more similar the raw edge feature is to the composite prototype edge feature.

10. The process of claim 9, wherein the process action of replacing the last-produced composite prototype edge feature with a current composite prototype edge feature produced, comprises the actions of:

(i) computing an edge pixel mean by dividing the sum of the number of edge pixels in each of the raw edge features by the total number of raw edge features assigned to the last-produced composite prototype feature;

(ii) respectively summing the grassfire values in each corresponding pixel location of the raw edge features assigned to the last-produced composite prototype edge feature to create a summed grassfire-transformed edge feature;

(iii) identifying locations in the summed grassfire-transformed edge feature having the lowest grassfire value and recording the quantity of these locations;

(iv) identifying locations in the summed grassfire-transformed edge feature having the next higher grassfire value and recording the quantity of these locations;

(v) adding the number of pixel locations having the lowest grass fire value to the number of pixel locations having the next higher grassfire value to produce a combined pixel location sum;

(vi) comparing the number of pixel locations having the lowest grassfire value, and the combined pixel location sum, to the edge pixel mean;

(vii) whenever the number of pixel locations having the lowest grassfire value is closer to the edge pixel mean than the combined pixel location sum, designate the pixel locations having the lowest grassfire value as edge pixels in the current composite prototype edge feature;

(viii) whenever the combined pixel location sum is closer to the edge pixel mean than the number of pixel locations having the lowest grassfire value, and the mean is less than the combined pixel location sum, designate the pixel locations associated with the combined pixel location sum as edge pixels in the current composite prototype edge feature;

(ix) whenever the combined pixel location sum is closer to the edge pixel mean than the number of pixel locations having the lowest grassfire value, and the mean is greater than the combined pixel location sum, identifying locations in the summed grassfire-transformed edge feature having the next higher, previously unconsidered grassfire value, and recording the quantity of these locations;

(x) adding the number of pixel locations associated with said next higher, previously unconsidered grassfire value to the last previously computed combined pixel location sum to produce a current combined pixel location sum;

(xi) comparing the number of pixel locations associated with the last previously-computed combined pixel location sum, and the current combined pixel location sum, to the edge pixel mean;

(xii) whenever the last previously-computed combined pixel location sum is closer to the edge pixel mean than the current combined pixel location sum, designate the pixel locations associated with the last previously-computed combined pixel location sum as edge pixels in the current composite prototype edge feature;

(xiii) whenever the current combined pixel location sum is closer to the edge pixel mean than the last previously-computed combined pixel location sum, and the mean is less than the current combined pixel location sum, designate the pixel locations associated with the current combined pixel location sum as edge pixels in the current composite prototype edge feature;

(xiv) whenever the current combined pixel location sum is closer to the edge pixel mean than the last previously-computed combined pixel location sum, and the mean is greater than the current combined pixel location sum, identifying locations in the summed grassfire-transformed edge feature having the next higher, previously unconsidered grassfire value, recording the quantity of these locations, and repeat process actions (x) through (xiii).

11. The process of claim 5, wherein the prescribed number of raw edge features is equal to all the raw edge features defined.

12. The process of claim 5, wherein the prescribed number of raw edge features is less than all the raw edge features defined, and wherein the prescribed number of raw edge features is selected at random from the raw edge features available.

13. The process of claim 12, wherein the prescribed number of raw edge features is greater than about 10,000.

14. The process of claim 2, wherein the process action of defining a Hough kernel for each prototype edge feature, comprises the actions of:
assigning a unique number to the prototype edge feature, said number hereinafter being referred to as a prototype index number;
producing an indexed training image from each edge pixel training image by assigning an appropriate prototype index number to each edge pixel location in the edge pixel training image, wherein the appropriate index number is the index number assigned to the prototype edge feature which is most similar to the raw edge feature associated with the edge pixel at the edge pixel location;
assigning an offset vector to each raw edge feature in each edge pixel training image, said offset vector defining the distance and direction from the center edge pixel of a raw edge feature to a pixel location in the edge pixel training image corresponding to a prescribed reference point on the surface of interest of the object depicted in the training image;
identifying each offset vector assigned to the edge pixels of the edge pixel training images whose location corresponds to a pixel location in the associated indexed training image to which the prototype edge feature under consideration has been assigned, and designating these offset vectors as elements of a Hough kernel for the prototype edge feature;
characterizing the Hough kernel for the prototype edge feature as an image having a central pixel location from which all the offset vectors identified as being an element of the Hough kernel originate, and whose pixels are assigned a vote number indicative of how many the offset vectors terminate at that location.

15. The process of claim 14, wherein the process action of producing an indexed training image from each edge pixel training image, comprises an action of determining the prototype edge feature which is most similar to each raw edge feature, said determining action comprising, for each raw edge feature, the actions of:
computing a grassfire transform from the raw edge feature and from each prototype edge feature, such that each edge pixel in the edge features is assigned a "0" and each non-edge pixel is assigned an integer number that increases the farther away the non-edge pixel is from the nearest edge pixel;
identifying all the pixel locations in the raw edge feature that correspond to edge pixel locations in the prototype edge feature;
summing the grassfire values assigned to the identified pixel locations in the raw edge feature to create a raw edge feature grassfire sum;
identifying all the pixel locations in each of the prototype edge feature that correspond to edge pixel locations in the raw edge feature;
for each of the prototype edge features, summing the grassfire values assigned to the identified pixel locations in the prototype edge feature to create a prototype edge feature grassfire sum;
respectively adding the raw edge feature grassfire sum to each of the prototype edge feature grassfire sums to create a plurality of combined grassfire sums;
identifying which of the combined grassfire sums is the smallest; and
designating the prototype edge feature associated with the smallest combined grassfire sum as the most similar to the raw edge feature under consideration.

16. The process of claim 14, wherein the prescribed reference point on the surface of interest of the object depicted in the training image is the centroid of the surface.

17. The process of claim 1, wherein the process action of identifying for each pixel in the input image depicting an edge, which prototype edge feature best represents the edge pixel pattern exhibited within said sub-window centered on the input image edge pixel under consideration, comprises the actions of:
- detecting edge pixels in the input image and producing an edge pixel input image representing the input image;
- defining a raw edge feature associated with each edge pixel in the edge pixel input image, wherein the raw edge feature comprises a sub-window in the edge pixel input image of a prescribed size which is centered on an edge pixel;
- assigning a unique number to each prototype edge feature, said number hereinafter being referred to as a prototype index number; and
- assigning an appropriate prototype index number to each edge pixel location in the edge pixel input image to create an indexed input image, wherein the appropriate index number is the index number assigned to the prototype edge feature which is most similar to the raw edge feature associated with the edge pixel at the edge pixel location under consideration.

18. The process of claim 17, wherein the prescribed size of the sub-window in the edge pixel input image is the same as the prescribed size of the sub-window employed in the training images.

19. The process of claim 18, wherein the prescribed size of both of the sub-windows is 7 by 7 pixels.

20. The process of claim 17, wherein the process action of assigning an appropriate prototype index number to each edge pixel location in the edge pixel input image, comprises an action of determining the prototype edge feature which is most similar to each raw edge feature in the edge pixel input image, said determining action comprising, for each raw edge feature, the actions of:
- computing a grassfire transform from the raw edge feature and from each prototype edge feature, such that each edge pixel in the edge features is assigned a "0" and each non-edge pixel is assigned an integer number that increases the farther away the non-edge pixel is from the nearest edge pixel;
- identifying all the pixel locations in the raw edge feature that correspond to edge pixel locations in the prototype edge feature;
- summing the grassfire values assigned to the identified pixel locations in the raw edge feature to create a raw edge feature grassfire sum;
- identifying all the pixel locations in each of the prototype edge feature that correspond to edge pixel locations in the raw edge feature;
- for each of the prototype edge features, summing the grassfire values assigned to the identified pixel locations in the prototype edge feature to create a prototype edge feature grassfire sum;
- respectively adding the raw edge feature grassfire sum to each of the prototype edge feature grassfire sums to create a plurality of combined grassfire sums;
- identifying which of the combined grassfire sums is the smallest; and
- designating the prototype edge feature associated with the smallest combined grassfire sum as the most similar to the raw edge feature under consideration.

21. The process of claim 17, wherein the process action of identifying how many offset vectors terminate at each pixel location in the input image from Hough kernels centered on each edge pixel location of the input image, comprises an action of generating a final voting image from the indexed input image, said generating action comprising the actions of:
- for each prototype index number,
  - identifying each pixel location in the indexed input image that has been assigned the prototype index number under consideration,
  - creating an equal-value index image for the prototype index number under consideration, wherein the equal-value index image is the same size as the indexed input image and is created by assigning a first binary pixel value to every pixel location with the exception of those pixel locations that correspond to the identified pixel locations of the indexed input image having a pixel value matching the prototype index number under consideration in which case the second binary pixel value is assigned to these pixel locations of the equal-value index image,
  - characterizing the Hough kernel associated with the prototype edge feature assigned the prototype index number under consideration as an image having a central pixel location from which all the offset vectors associated therewith originate, and whose pixels are assigned a vote count indicative of how many the offset vectors terminate at that location,
  - superimposing the Hough kernel associated with the prototype edge feature assigned the prototype index number under consideration onto each of the pixel locations of the equal-value index image exhibiting the second binary pixel value such that the Hough kernel's central pixel location corresponds to each of these pixel locations,
  - for each pixel location in the equal-value index image, assigning the sum of the vote counts associated with Hough kernel pixels superimposed on that pixel location to a corresponding pixel location of an initial voting image associated with the equal-value index image; and
- combining each of the initial voting images to create a final voting image by respectively summing the summed vote counts assigned to each corresponding pixel location across all the initial voting images and assigning the resulting sum to that location in the final voting image.

22. The process of claim 17, wherein the process action of generating training images, comprises the actions of:
- inputting a model image that depicts the surface of interest of the object;
- creating a base training image depicting the portion of the model image containing said surface of interest; and
- synthesizing training images from the base image which depict the object's surface of interest in different orientations; and wherein the model image, base training image, and synthetic training images are color images.

23. The process of claim 22, wherein the process action of detecting edge pixels in the input image and producing an edge pixel input image representing the input image, comprises the process actions of:
- identifying which color levels among all the possible color levels are acceptably related to the color levels exhibited by the pixels of the object's surface of interest as depicted in the base training image; and eliminating from consideration as pixels depicting an edge, every pixel location in the edge pixel input image corresponding to a pixel location in the input image whose pixel exhibits a color level not among those identified as being acceptably related to the color levels exhibited by the pixels of the object's surface of interest in the base training image.

24. The process of claim 23, wherein the process action of identifying which color levels among all the possible color levels are acceptably related to the color levels exhibited by the pixels of the object's surface of interest, comprises the actions of:

establishing a lookup table having a separate cell for each possible pixel color level;

identifying the color level of each pixel associated with the object's surface of interest;

normalizing each of the identified color levels associated with the object's surface of interest to produce a plurality of object-related color levels;

normalizing each color level of the lookup table;

establishing a final acceptance region of a prescribed size for each of the normalized object-related color levels, wherein the acceptance region indicates a range of color levels that is considered equivalent to a particular normalized object-related color level; and setting the cells of the lookup table to a first binary value if the cell's normalized color level is not found within the final acceptance region of at least one of the normalized object-related color levels, and setting the cells of the lookup table to a second binary value if the cell's normalized color level is found within the final acceptance region of at least one of the normalized object-related color levels, to create a final binary lookup table.

25. The process of claim 24, wherein the process action of eliminating from consideration as pixels depicting an edge, every pixel location in the edge pixel input image corresponding to a pixel location in the input image whose pixel exhibits a color level not among those identified as being acceptably related to the color levels exhibited by the pixels of the object's surface of interest in the base training image, comprises the actions of:

identifying the color level of each pixel of the input image;

identifying those pixels of the input image that exhibit a color level which is set to the first binary level in the final binary lookup table, thereby indicating that the pixels are not object-related, setting each pixel location in the edge pixel input image corresponding to a pixel location in the input image identified as having a pixel that is not object-related to a pixel value reserved to indicate a non-edge pixel.

26. The process of claim 24, wherein the process action of establishing a final acceptance region of a prescribed size for each of the normalized object-related color levels, comprises the actions of:

(a) employing as the prescribed size of an initial acceptance region one of (i) a default size, or (ii) a user-specified size;

(b) setting the cells of the lookup table to a first binary value if the cell's normalized color level is not found within the initial acceptance region of at least one of the normalized object-related color levels, and setting the cells of the lookup table to a second binary value if the cell's normalized color level is found within the final acceptance region of at least one of the normalized object-related color levels, to create an initial binary lookup table;

(c) identifying the color levels of each pixel of the model image;

(d) setting a pixel of the model image to the first binary value whenever the color level identified for that pixel corresponds to a cell of the initial binary lookup table that has been set to said first binary level, and setting a pixel of the model image to the second binary value whenever the color level identified for that pixel corresponds to a cell of the initial binary lookup table that has been set to said second binary level, to create a binary model image;

(e) displaying the binary model image to the user in a manner that all the pixels of the image set to the first binary value are displayed using a first color level, and all the pixels of the image set to the second binary value are displayed using a second, contrasting color level;

(f) requesting the user to provide a revised size for the acceptance region, whenever the user determines that a substantial number of the pixels depicting the object's surface of interest are not displayed using said second color level;

(g) repeating process actions (b) through (f) employing the revised size for the acceptance region in place of the prescribed size of the initial acceptance region, whenever a revised size is provided by the user; and (h) establishing as the prescribed size of the final acceptance region, the last-employed prescribed size of the acceptance region, whenever the user does not provide a revised size for the acceptance region.

27. The process of claim 26, wherein the color levels are measured in terms of the red, green and blue (RGB) color components exhibited by a pixel, and wherein the default size of the initial acceptance region is 5 RGB units in any direction.

28. The process of claim 21, wherein the process action of declaring the object to be present in the input image, comprises the actions of:

establishing a final detection threshold defining the minimum vote count necessary to indicate that a pixel location in the final voting image could correspond to the pixel location of the prescribed reference point of the object's surface of interest in the input image;

for each pixel of the final voting image, ascertaining if the pixel's vote count equals or exceeds the final detection threshold;

declaring the object's surface of interest, and so the object, to be present in the input image only if at least one of the pixels of the final voting image equals or exceeds the final detection threshold.

29. The process of claim 28, further comprising the process actions of:

determining which pixel of the final voting image, among the pixels thereof equaling or exceeding the final detection threshold, exhibits the highest vote count; and designating the pixel location of input image corresponding to the pixel location of the pixel in the final voting image determined to exhibit the highest vote count equaling or exceeding the final detection threshold to be the location of the prescribed reference point on the object's surface of interest as it appears in the input image.

30. The process of claim 28, wherein the process action of establishing a final detection threshold, comprises the actions of:

(a) employing as an initial detection threshold one of (i) a default value, or (ii) a user-specified value;

(b) identifying for each pixel depicting an edge in one of (i) the model image, or (ii) a new image of the scene depicting the object's surface of interest at a known location therein, which prototype edge feature best represents the edge pixel pattern exhibited within the sub-window centered on the edge pixel under consideration;

(c) for each pixel location in the model image or new image, identifying how many offset vectors terminate at that location from Hough kernels centered on each edge pixel location, wherein the Hough kernel centered on each pixel location is the Hough kernel associated with the prototype edge feature best representing the edge pixel pattern exhibited within said sub-window centered on that edge pixel location, and wherein the number of offset vectors identified as terminating at a particular pixel constitutes a vote count for that pixel;

(d) displaying the model image or new image to the user with the pixel location having vote counts equaling or exceeding the initial detection threshold highlighted in a manner apparent to the user;

(e) requesting the user to provide a revised detection threshold having a higher value whenever the user determines that a significant number of pixels not depicting the object's surface of interest are highlighted, and requesting the user to provide a revised detection threshold having a lower value whenever the user determines that too few of the pixels depicting the object's surface of interest are highlighted;

(f) repeating process actions (b) through (e) employing the revised detection threshold in place of the initial detection threshold, whenever a revised detection threshold is provided by the user; and (g) establishing as the final detection threshold, the last-employed detection threshold, whenever the user does not provide a revised detection threshold.

31. A system for training at least one general purpose computing device to recognize objects in an input image of a scene, comprising:

at least one general purpose computing device; and a computer program comprising program modules executable by the at least one computing device, wherein the at least one computing device is directed by the program modules of the computer program to, generate training images depicting a surface of interest of an object it is desired to recognized in said input image of the scene, wherein said generating comprises, inputting a model image that depicts the surface of interest of the object, creating a base training image depicting the Portion of the model image containing said surface of interest, and synthesizing training images from the base image which depict the object's surface of interest in different orientations, wherein said synthesizing comprises, (a) synthetically pointing a normal vector of the object's surface of interest at one of a prescribed number of nodes of a tessellated hemisphere defined as overlying the surface of interest, (b) simulating a paraperspective projection representation of the surface of interest, and (c) repeating sub-module (a) and (b) for each of the remaining nodes of the tessellated hemisphere;

create a set of Prototype edge features which collectively represent the edge pixel patterns encountered within a sub-window centered on each pixel depicting an edge of the object in the training images, and define a Hough kernel for each prototype edge feature, wherein a Hough kernel for a particular prototype edge feature is defined by a set of offset vectors representing the distance and direction, from each edge pixel having a sub-window associated therewith that has an edge pixel pattern best represented by the Prototype edge feature, to a prescribed reference point on the surface of interest of the object, wherein said offset vectors are represented in the Hough kernel as originating at a central point thereof, wherein said set of prototype edge features and said Hough kernels associated therewith are used to recognize said object in the input image and to identify the location of the object in the input image.

32. The system of claim 31, wherein the tessellated hemisphere has 31 nodes each of which is spaced apart from each adjacent node by approximately 20 degrees.

33. The system of claim 31, wherein there are no nodes of the tessellated hemisphere within a prescribed distance from the equator of the hemisphere.

34. The system action of claim 33, wherein there are no nodes of the tessellated hemisphere within approximately 20 degrees of the equator of the hemisphere.

35. The system of claim 31, wherein the sub-module for synthesizing training images, further comprises a sub-module for:

synthetically rotating each of the simulated paraperspective projection representations of the surface of interest incrementally about the normal vector of the surface; and simulating a training image at each of a prescribed number of rotation increments.

36. The system of claim 35, wherein the sub-module for simulating a training image at each of a prescribed number of rotation increments, comprises simulating a training image after about each 20 degrees of rotation.

37. The system of claim 35, wherein the sub-module for synthesizing training images, further comprises sub-modules for:

incrementally scaling each of the synthesized training images either up, down, or both; and simulating a training image at each of a prescribed number of scale increments.

38. The system of claim 37, wherein the sub-module for simulating a training image at each of a prescribed number of scale increments, comprises simulating a training image at 10 percent scaling increments.

39. A system for recognizing objects in an input image of a scene, said system having a set of prototype edge features and a set of Hough kernels associated therewith each of which is comprised of a plurality of offset vectors originating from a central point of the associated Hough kernel, said system comprising:

at least one general purpose computing device; and a computer program comprising program modules executable by the at least one computing device, wherein the at least one computing device is directed by the program modules of the computer program to, identify for each pixel in the input image depicting an edge, which prototype edge feature best represents the edge pixel pattern exhibited within a sub-window centered on the input image edge pixel under consideration, for each pixel location in the input image, identify how many offset vectors terminate at that location from Hough kernels centered on each edge pixel location of the input image, wherein the Hough kernel centered on each pixel location is the Hough kernel associated with the prototype edge feature best representing the edge pixel pattern exhibited within said sub-window centered on that input image edge pixel location, and declare the object to be present in the input image if any of the pixel locations in the input image have a quantity of offset vectors terminating thereat that exceed a detection threshold which is indicative of the presence of the surface of interest of the object.

40. A computer-readable memory for recognizing objects in an input image of a scene, comprising:

a computer-readable storage medium; and a computer program comprising program modules stored in the storage medium, wherein the storage medium is so configured by the computer program that it causes a computer to, generate training images depicting an object it is desired to recognized in said input image of the scene, for each training image, detect edge pixels and producing an edge pixel training image representing the training image, define a raw edge feature associated with each edge pixel, said raw edge feature comprising a sub-window in the edge pixel training image of a prescribed size which is centered on an edge pixel, and assign an offset vector to each raw edge feature, said offset vector defining the distance and direction from the center edge pixel of a raw edge feature to a pixel location in the edge pixel training image corresponding to a prescribed reference point on the object in the training image, create a prescribed number of prototype edge features each of which represents a group of the raw edge features and assigning a unique index number to each prototype edge feature, wherein each raw edge feature in a group of raw edge features represented by a prototype edge feature is more similar to that prototype edge feature than any of the other prototype edge features, produce an indexed training image from each edge pixel training image by assigning an appropriate prototype index number to each edge pixel location in the edge pixel training image, wherein the appropriate index number is the index number assigned to the prototype edge feature which is most similar to the raw edge feature associated with the edge pixel at the edge pixel location under consideration, create a Hough kernel for each prototype edge feature, wherein a Hough kernel for a particular prototype edge feature comprises every offset vector associated with a raw edge feature in the group of raw edge features represented by the prototype edge feature, and wherein each of said offset vectors originates at a central point of the Hough kernel, produce an indexed input image by, detecting edge pixels and producing an edge pixel input image representing the input image, defining a raw edge feature associated with each edge pixel, and assigning an appropriate prototype index number to each edge pixel location in the edge pixel input image, wherein the appropriate index number is the index number assigned to the prototype edge feature which is most similar to the raw edge feature associated with the edge pixel at the edge pixel location under consideration, generate a voting image from the indexed input image by, for each pixel location in the indexed input image, identifying how many offset vectors terminate at that pixel location from Hough kernels centered on each pixel of the indexed input image having a prototype index number assigned thereto, wherein the Hough kernel centered on each pixel is the Hough kernel associated with the prototype edge feature to which the index number of that pixel has been assigned, and assigning a vote count to each pixel of the indexed input image indicative of how many of said offset vectors terminated at that pixel location, ascertain if any of the vote counts in the voting image exceed a prescribed detection threshold which is indicative of the presence of the object being recognized in the input image, and declare the object to be present in the input image if the detection threshold is exceeded by any of the vote counts of the voting image pixels and designate the pixel location associated with the pixel having the largest vote count exceeding the threshold as corresponding to the pixel location of said prescribed reference point of the object being recognized in the input image.

41. A computer-implemented process for computing the similarity between a pair of edge features, wherein an edge feature represents the edge pixel patterns encountered within a sub-window centered on a pixel of an image, comprising using a computer to perform the following process actions:

computing a grassfire transform from each edge feature, such that each edge pixel in the edge features is assigned a "0" and each non-edge pixel is assigned an integer number that increases the farther away the non-edge pixel is from the nearest edge pixel;

identifying all the pixel locations in the first edge feature that correspond to edge pixel locations in the second edge feature;

summing the grassfire values assigned to the identified pixel locations in the first edge feature to create a first edge feature grassfire sum;

identifying all the pixel locations in the second edge feature that correspond to edge pixel locations in the first edge feature;

summing the grassfire values assigned to the identified pixel locations in the second edge feature to create a second edge feature grassfire sum; and adding the first edge feature grassfire sum to the second edge feature grassfire sum to create a combined grassfire sum, wherein the smaller the combined grassfire sum, the more similar the first edge feature is to the second edge feature.

42. A computer-implemented process for computing a composite edge feature from a plurality of edge features, wherein an edge feature represents the edge pixel patterns encountered within a sub-window centered on a pixel of an image, comprising using a computer to perform the following process actions:

(a) computing an edge pixel mean by dividing the sum of the number of edge pixels in each of the edge features by the total number of edge features;

(b) computing a grassfire transform from each edge feature, such that each edge pixel in the edge features is assigned a "0" and each non-edge pixel is assigned an integer number that increases the farther away the non-edge pixel is from the nearest edge pixel;

(c) respectively summing the grassfire values in each corresponding pixel location of the edge features to create a summed grassfire-transformed edge feature;

(d) identifying locations in the summed grassfire-transformed edge feature having the lowest grassfire value and recording the quantity of these locations;

(e) identifying locations in the summed grassfire-transformed edge feature having the next higher grassfire value and recording the quantity of these locations;

(f) adding the number of pixel locations having the lowest grass fire value to the number of pixel locations having the next higher grassfire value to produce a combined pixel location sum;

(g) comparing the number of pixel locations having the lowest grassfire value, and the combined pixel location sum, to the edge pixel mean;

(h) whenever the number of pixel locations having the lowest grassfire value is closer to the edge pixel mean than the combined pixel location sum, designate the pixel locations having the lowest grassfire value as edge pixels in the composite edge feature;

(i) whenever the combined pixel location sum is closer to the edge pixel mean than the number of pixel locations having the lowest grassfire value, and the mean is less than the combined pixel location sum, designate the pixel locations associated with the combined pixel location sum as edge pixels in the composite edge feature;

(j) whenever the combined pixel location sum is closer to the edge pixel mean than the number of pixel locations having the lowest grassfire value, and the mean is greater than the combined pixel location sum, identifying locations in the summed grassfire-transformed edge feature having the next higher, previously unconsidered grassfire value, and recording the quantity of these locations;

(k) adding the number of pixel locations associated with said next higher, previously unconsidered grassfire value to the last previously computed combined pixel location sum to produce a current combined pixel location sum;

(l) comparing the number of pixel locations associated with the last previously-computed combined pixel location sum, and the current combined pixel location sum, to the edge pixel mean;

(m) whenever the last previously-computed combined pixel location sum is closer to the edge pixel mean than the current combined pixel location sum, designating the pixel locations associated with the last previously-computed combined pixel location sum as edge pixels in the composite edge feature;

(n) whenever the current combined pixel location sum is closer to the edge pixel mean than the last previously-computed combined pixel location sum, and the mean is less than the current combined pixel location sum, designate the pixel locations associated with the current combined pixel location sum as edge pixels in the composite edge feature;

(o) whenever the current combined pixel location sum is closer to the edge pixel mean than the last previously-computed combined pixel location sum, and the mean is greater than the current combined pixel location sum, identifying locations in the summed grassfire-transformed edge feature having the next higher, previously unconsidered grassfire value, recording the quantity of these locations, and repeat process actions (k) through (n).

* * * * *